(12) United States Patent  
Sato

(10) Patent No.: US 6,457,662 B1  
(45) Date of Patent: Oct. 1, 2002

(54) ROTOR DRIVE DEVICE AND ITS SPINNING REEL HOUSING

(75) Inventor: Jun Sato, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/616,391

(22) Filed: Jul. 13, 2000

(30) Foreign Application Priority Data

Jul. 14, 1999 (JP) ............................................ 11-200460  
Oct. 14, 1999 (JP) ............................................ 11-292714

(51) Int. Cl.[7] ............................................ A01K 89/02
(52) U.S. Cl. ........................ 242/247; 242/260; 242/319; 242/321
(58) Field of Search ................................. 242/242, 247, 242/257, 260, 273, 278, 279, 295, 319, 321

(56) References Cited

U.S. PATENT DOCUMENTS

| 4,651,945 | A | | 3/1987 | Ruin |
| 5,295,640 | A | | 3/1994 | Kawabe |
| 5,299,757 | A | | 4/1994 | Sugawara |
| 5,322,240 | A | * | 6/1994 | Sato ............................ 242/295 |
| 5,443,218 | A | | 8/1995 | Ciocca |
| 5,503,343 | A | * | 4/1996 | Hirano et al. ................ 242/247 |
| 5,570,851 | A | * | 11/1996 | Yamaguchi et al. ......... 242/247 |
| 5,820,051 | A | * | 10/1998 | Takeuchi et al. ............ 242/247 |
| 5,927,630 | A | * | 7/1999 | Katayama ................... 242/247 |
| 5,996,918 | A | * | 12/1999 | Nanbu ........................ 242/319 |
| 6,019,301 | A | * | 2/2000 | Hitomi ........................ 242/247 |
| 6,050,512 | A | * | 4/2000 | Jung ........................... 242/247 |
| 6,073,870 | A | * | 6/2000 | Shinohara et al. .......... 242/321 |
| 6,273,351 | B1 | * | 8/2001 | Tsukihiji et al. ............ 242/247 |

FOREIGN PATENT DOCUMENTS

| EP | 0 860 112 | 8/1998 |
| EP | 0 986 953 | 3/2000 |
| FR | 2 517 174 | 6/1983 |
| JP | 11018638 | 1/1999 |

* cited by examiner

Primary Examiner—Emmanuel M. Marcelo

(57) ABSTRACT

A spinning reel rotor drive device that keeps thrust force from acting upon the one-way clutch. The rotor drive device 5 for a spinning reel drives a rotor in the reeling direction according to the rotation of a handle rotatably supported on a reel unit, and prevents the rotor from reversing in the line winding-out direction, said apparatus comprising a face gear 11, a pinion gear 12, a bearing 16, a restriction member 17, and a rotation check mechanism 13. The bearing is fitted in a state of restricted movement to the rear thereof on the barrel 14 of the reel unit in order to rotatably support the pinion gear on the reel unit. The restriction member is fixed to the reel unit in order to restrict the forward movement of the bearing. The rotation check mechanism has a roller-type one-way clutch provided ahead of the restriction member, and prevents the rotor from reversing in the line winding-out direction.

34 Claims, 10 Drawing Sheets

ROTOR DRIVE DEVICE AND ITS SPINNING REEL HOUSING

BACKGROUND OF THE INVENTION

1. Technical Field

The present invention relates to fishing-rod attachable spinning reels that wind fishing line about an axis paralleling the rod. In particular the invention relates to a rotor drive device for such spinning reels, which drives the spinning reel rotor in the reeling-in direction by the rotation of a handle rotatably supported on the reel unit, and which prevents the rotor from reversing in the line winding-out direction.

2. Description of Related Art

Spinning reels are generally fitted on fishing rods wherein the fishing line winds about an axis paralleling the rod. Such spinning reels have a reel unit with a handle, a rotor that is rotatably supported on the reel unit, a spool fitted on the reel unit movably in the axial direction and around which a fishing line guided by the rotor is wound.

The handle is disposed sideways, orthogonal to the spool axis. The rotor has first and second arms disposed opposite each other as though clasping the longitudinally disposed rotating shaft. A bail free to pivot via bail support members is provided on the distal ends of the arm components, and a line roller is provided at the distal end of one of the bail support members. When fishing line is reeled in, it is guided around the outer periphery of the spool by the bail and the line roller.

Drive mechanisms—a rotor drive mechanism for transmitting rotation of the handle to the rotor, and an oscillating mechanism for moving the spool back and forth in the longitudinal direction—are provided inside the reel unit. The rotor is non-rotatably fixed to the front end of the pinion gear.

The rotor drive device has a face gear that rotates in conjunction with the handle, and a pinion gear that is disposed along a longitudinal direction offset from the face gear and that meshes with the face gear. The pinion gear is unable to rotate with respect to the rotor, and when the handle is rotated, the pinion gear rotates via the face gear, causing the rotor to rotate.

With this sort of spinning reel, the rotor drive device is provided with a rotation check apparatus so that the rotor will not reverse in the line winding-out direction during casting or reeling.

Among spinning reels of this class, ones in which a cylindrical barrel is formed protruding from the front part of the reel unit are disclosed in Japanese Laid-Open Utility Model Application S62-80567 and Japanese Laid-Open Patent Application H6-58348.

The spinning reel disclosed in the former publication has a pair of bearings that support the pinion gear inside the barrel. The pinion gear extends into the reel unit, and the inside of the barrel communicates with the inside of the reel unit.

The spinning reel disclosed in the latter publication has disposed inside the barrel a reversing check mechanism having a roller-type one-way clutch. The reversing check mechanism is fitted between the front part of the reel unit and the pinion gear, and prevents the reversal of the rotor by prohibiting the reverse rotation of the pinion gear. A rolling-contact bearing for rotatably supporting the pinion gear on the reel unit is fitted at the front part of the reel unit, and the rotation check apparatus is disposed forward of the rolling-contact bearing and in contact with the rolling-contact bearing.

The reversing check mechanism comprises a roller-type one-way clutch that is able to assume an operational position in which reversal is permitted and a non-operational position in which reversal is prohibited, and a switching mechanism for switching the one-way clutch between its operational position and non-operational position.

The one-way clutch has: an outer ring fitted non-rotatably to the barrel; an inner ring relatively rotatable with respect to the outer ring; a plurality of roller members disposed between the outer and inner rings and able to assume a dovetailing operational position between the rings and an idling non-operational position in between the rings; and an annular retaining piece that retains the rolling members circumferentially spaced apart, and that retains them at the front and rear ends. Screws threaded into the barrel axially immovably fit the outer ring on. The annular retaining piece is fitted permitting rotation on the inner ring.

The switching mechanism has a switching member that is rotatably coupled to the annular retaining piece forward of the outer ring and that switches the roller members between their operational and non-operational positions, and a switching lever for rotating the switching member. The switching member is rotatably fitted at one end to the annular retaining piece, and the other end extends radially. The switching lever engages the other end of the switching member on the outer peripheral side of the barrel, and passes from the engaged portion through the reel unit, protruding at the rear part of the reel unit.

With a conventional spinning reel having a thus structured reversing check mechanism, when the handle is rotated in the reeling-in direction, the pinion gear is also rotated in the reeling-in direction, causing the rotor to rotate in the reeling-in direction. Meanwhile, when the roller members are displaced to the operational position, reverse rotation of the pinion gear is prohibited even if the rotor is subjected to force in the reverse direction during casting or the like, and therefore reverse rotation of the rotor is prevented.

In the foregoing conventional configuration, if the fishing line is subjected to a strong tensile force due to a bite from a fish, a snag, or the like, the rotor is pulled axially forward, and is subjected to forward thrust force (axially directed force). When forward thrust acts on the rotor, the force is also transmitted to the rolling-contact bearing via the pinion gear. Since the one-way clutch is disposed in contact with the rolling-contact bearing, when forward thrust acts on the rolling-contact bearing, the forward thrust force also acts upon the one-way clutch.

When thrust force thus acts on the one-way clutch, the roller members of the one-way clutch are also subjected to thrust force, which requires roller-member dimensioning that takes the thrust force into account. At the same time is the concern that problems such as an uneven load acting on the rolling members will arise. Also, in order to restrict the movement of the one-way clutch in the axial direction, screws or the like to handle heavy loads must be utilized so as to withstand the thrust force.

SUMMARY OF THE INVENTION

An object of the present invention is a rotor drive device for a spinning reel wherein thrust force does not act on the one-way clutch.

Because a bearing supporting the pinion gear is provided inside the barrel in each of the conventional configurations discussed above, the rotational efficiency of the rotor tends to decline if liquid such as sea water should seep in from the barrel and corrode the bearing. Furthermore, since the barrel communicates with the inside of the reel unit, if liquid should seep from the barrel into the reel unit, the drive mechanisms—the oscillating mechanism and rotor drive mechanism—will corrode, further deteriorating rotational efficiency. In particular, in the latter conventional configuration, a roller-type one-way clutch is disposed in addition to the bearing inside the barrel, and if this clutch becomes corroded the rotational efficiency of the rotor will decline even further.

Furthermore, in the conventional spinning reel disclosed in the latter publication, because the switching mechanism switches the state of the reversing check mechanism forward of the outer ring, the switching member coupled to the annular retaining piece is positioned forward of the barrel. Positioning the rotating switching member forward of the barrel makes a structure in which waterproofing toward the front end of the barrel in the reel unit is difficult. Consequently, there is the danger of liquid seeping into the interior of the reel unit, including the barrel. Furthermore, since the switching lever passing through the reel unit is engaged with the switching member on the outside of the barrel, the portion of the switching lever that passes through must also be sealed, resulting in a complicated structure for waterproofing the reel unit.

Another object of the present invention is a spinning reel having a barrel wherein a simple structure enables infiltration of liquid from the barrel to be surely prevented.

Yet a further object of the present invention is to improve sealing of the one-way clutch of the reversing check mechanism in a spinning reel rotor drive device by restraining the reversing check mechanism against forward thrust to curb strain on the seal fitted into open front end of the barrel housing the reversing check mechanism.

In one aspect of the invention, a spinning reel rotor drive device in a spinning reel unit having a frontward barrel, a rotor drive device for line-reel-in driving the rotor in response to rotation of a handle rotatively supported on the reel unit, and for preventing reversing of the rotor in the line winding-out direction includes: a face gear for rotating in conjunction with rotation of the handle; a pinion gear disposed along a longitudinal direction offset from the face gear and non-rotatable with respect to the rotor, for meshing with the face gear; a bearing fitted to the barrel of the reel unit for rotatively supporting the pinion gear in the reel unit; and a reversing check mechanism having a roller-type one-way clutch provided in the barrel, for checking rotor reversal in the line wind-out direction.

In the rotor drive device rotating the handle in the line winding-in direction rotates the pinion gear via the face gear. Herein, because the one-way clutch of the reversing check mechanism permits rotation in the line winding-in direction, the rotor rotates in the line winding-in direction and fishing line is guided onto the spool, and is wound onto the spool. Meanwhile, tension due to a striking fish or the like acting on the rotor tends to reverse the rotor in the line reeling out direction, but since rotor reversal is prohibited by the reversing check mechanism, the rotor does not reverse. Because the reversing check mechanism of the one-way clutch and the bearing are disposed within the barrel, the one-way clutch and the bearing can be waterproofed by sealing only the open end of the barrel.

The rotor drive device for a spinning reel in another aspect of the invention is an apparatus which drives a rotor in the reeling direction according to the rotation of a handle rotatably supported on a reel unit, and which prevents the rotor from reversing in the line winding-out direction, comprising a face gear, a pinion gear, a bearing, a restriction means, and a rotation check mechanism. The face gear rotates in conjunction with the rotation of the handle. The pinion gear cannot rotate with respect to the rotor, is disposed in the longitudinal direction offset from the face gear, and meshes with the face gear. The bearing is fitted on the front portion of the reel unit in order to rotatably support the pinion gear on the reel unit. The restriction means is provided to the reel unit in order to restrict the forward movement of the bearing. The rotation check mechanism has a roller-type one-way clutch provided in front of the restriction means, for preventing the roller from reversing in the line winding-out direction.

With this rotor drive device, when the handle is rotated in the reeling direction, the pinion gear is rotated via the face gear. At this point the one-way clutch of the rotation check mechanism permits rotation in the reeling direction, so the rotor rotates in the reeling direction, and the fishing line is guided onto and wound around the spool. On the other hand, the rotor will not reverse in the line winding-out direction if subjected to a tensile force by the pull of a fish or the like because the rotation check mechanism prohibits the reverse rotation of the rotor. Accordingly, a forward thrust force is generated at the rotor. This thrust force is transmitted through the pinion gear to the bearing, and the forward thrust force then acts upon the bearing. Since the forward movement of the bearing is restricted by the restriction means, however, the thrust force acting upon the bearing is received by the restriction means, and is not transmitted forward from the bearing.

This means that even if the rotor is subjected to a forward thrust force, the thrust force will not act upon the one-way clutch of the rotation check mechanism provided ahead of the bearing.

The rotor drive device for a spinning reel in a further aspect is as set forth in the foregoing, and further wherein the bearing is a rolling bearing having an outer race fitted on the reel unit, an inner race disposed to the inner peripheral side of the outer race and fitted on the pinion gear, and a plurality of rolling elements disposed between the two rings, in contact with the two rings, and spaced apart in the circumferential direction, and the restriction means restricts the forward movement of the outer race. In this case, the forward thrust force is transmitted from the pinion gear to the inner race of the rolling bearing, and even if it is further transmitted through the rolling elements to the outer race, since the forward movement of the outer race is restricted by the restriction means, any thrust force acting upon the outer race will be received by the restriction means and will not be transmitted any further forward.

In yet another aspect the rotor drive device for a spinning reel of the invention is the apparatus as set forth above, yet further wherein the one-way clutch has an outer member that cannot rotate with respect to the reel unit, an inner member that is disposed on the inner peripheral side of the outer member and cannot rotate with respect to the pinion gear, a plurality of rolling members that are disposed between the outer and inner members and are able to assume an operational position in which they engage between the outer and inner members and a non-operational position in which they idle between the outer and inner members, and a cover member that is disposed non-rotatably in the axial direction with respect to the reel unit, is in contact with the front portion of the outer member, and covers the outer member and the rolling members. In this case, no forward thrust force acts upon the one-way clutch, so the thrust force does not need to be taken into account in designing the size of the rolling members, and problems such as an uneven load acting upon the rolling members are not encountered. Also, the overall movement of the one-way clutch in the axial direction can be restricted by providing a load-lightening retainer structure to the cover member, so there is no need for space in which to attach a screw or the like, allowing the overall apparatus to be more compact.

The rotor drive device in another aspect is the apparatus as set forth above, and further wherein the reel unit has at its front portion a barrel on which are formed a first cylindrical portion and a second cylindrical portion that is formed in a larger diameter than the first cylindrical portion and ahead of the first cylindrical portion, and that is open at its distal end, and the bearing is fitted to the first cylindrical portion, the one-way clutch is fitted to the second cylindrical portion, and the restriction means is a plate member fixed at the stepped portion formed at the boundary between the first cylindrical portion and second cylindrical portion. In this case, the bearing and the one-way clutch are housed in the two cylinders of the barrel, so the outer peripheral portions of these parts are not exposed to the outside. Accordingly, the overall rotor drive device can be easily given a waterproof structure merely by sealing with the cover member at the front portion of the one-way clutch. Furthermore, since forward thrust force does not come into winding, movement in the axial direction can be restricted with a simple structure such as a retaining member. This eliminates the need to take into account such possibilities as liquid leaking in through a screw hole, and allows the waterproof structure to be simplified.

In a yet further aspect of the present invention, the spinning reel rotor drive device is as described above, yet additionally wherein the outer member is fitted non-rotatably on the second cylindrical portion, the inner member is incapable of relative rotation with respect to the outer member and has an axial length such that its ends protrude from the outer member, and the cover member is fitted on the second cylindrical portion toward the opening side from the outer member and such that it cannot rotate in the axial direction, and seals the gap between the outer peripheral surface of the inner member and the inner peripheral surface of the second cylindrical portion. In this case, since the inner member protrudes beyond the outer member, the overall rotor drive device, including the one-way clutch and bearing, can be sealed with a simple waterproof structure merely by sealing the gap between the outer peripheral surface of the inner member and the inner peripheral surface of the second cylindrical portion by means of a cover member that has a sealing function. Furthermore, since the inner member protrudes outward, the parts that make up the one-way clutch can be made into a single unit if the cover member is retained in the axial direction on the inner member side just during assembly or replacement. This facilitates the fitting of the one-way clutch to the second cylindrical portion.

The spinning reel rotor drive device in a still further aspect is the device as set forth in the foregoing, yet wherein an annular groove is formed in the inner peripheral surface on the opening side of the second cylindrical portion, and there is further provided an elastic retaining member fitted in the annular groove in order to retain the cover member by restricting its movement in the forward axial direction. In this case, the movement of the entire one-way clutch in the axial direction can be restricted by the retaining member, so the structure of the rotation check mechanism is simpler.

The spinning reel rotor drive device in accordance with the present invention in a further aspect is that set forth in the foregoing aspects, wherein at least part of the cover member is made from an elastic material having a lip component with a tapered cross section that comes into contact with the outer peripheral surface of the inner ring on the inner peripheral side. In this case, the tapered lip component is provided to the portion of the cover member that comes into contact with the inner member that rotates along with the pinion gear, so there is less contact resistance with the inner member, and the increase in rotational resistance of the rotor can be kept to a minimum even if a sealed structure is employed.

In another aspect the rotor drive device for a spinning reel of the invention is the apparatus as set forth above, yet further wherein the cover member has a reinforcing ring made of metal and in the form of a washer, and a sealing component made of an elastic material having a lip component on the inner peripheral side and formed so as to envelop the reinforcing ring. In this case, since the cover member is reinforced by the reinforcing ring, the rigidity of the cover member is higher, which increases the durability of the cover member, and the movement of the entire one-way clutch in the axial direction is also effectively suppressed by the cover member.

In still another aspect the rotor drive device for a spinning reel of the invention is the apparatus as set forth above, yet further wherein the inner member has a member fitting component to which is detachably fitted an assembly facilitating member for fixing the cover member on the inner member side. In this case, if the cover member is fixed to the inner member by fitting the assembly facilitating member to the member fitting component, the one-way clutch can be handled as a unit in assembly, simplifying the assembly work. This assembly facilitating member is removed once the assembly work is finished. The attachment and removal of the entire one-way clutch can also be simplified during replacement of the one-way clutch by pulling on the inner member after this assembly facilitating member has been attached.

In another aspect the rotor drive device for a spinning reel of the invention is the apparatus as set forth above, yet further wherein the cover member has an annular protrusion that protrudes at some point in the radial direction toward the rolling members and is in contact with the rolling members. In this case, the movement of the rolling members in the axial direction can be restricted, allowing the transmission efficiency of the one-way clutch to be increased and the generation of noise by movement in the axial direction to be suppressed.

In yet another aspect the rotor drive device for a spinning reel of the invention is the apparatus as set forth above, yet further wherein the rotor has a boss portion fitted non-rotatably front-endwise to the pinion gear. Therein, the outside member is fitted non-rotatably into the second cylindrical section; the inside member is rotatable relative to the outside member; and the cover member is axially immovably fitted into the second cylindrical section toward the open end thereof from the outside member. The cover member seals the gap between the inside member along its outer circumferential surface and the second cylindrical section along its inner circumferential surface.

In this case, since the cover member contacts the rotor, the outside member need not extend toward the open end more than the inside member, which shortens the axial dimension of the pone-way clutch.

In a still further another aspect the rotor drive device for a spinning reel of the invention is the apparatus as set forth above, yet further wherein the one-way clutch further has a support member that supports the plurality of rolling members spaced apart in the rotational direction between the outer member and the inner member, and a biasing member that biases the rolling members toward the operational position, and the rotation check mechanism further has an operating mechanism disposed sandwiching the outer member on the opposite side from the cover member in order to move the support member in the rotational direction and thereby move the plurality of rolling members between the operational position and the non-operational position. In this case, when the support member is moved by the operating mechanism and the rolling members are moved to the non-operational position, the reverse rotation of the rotor is permitted and movement to the operational position side is prohibited. Accordingly, the rotor can be easily reversed when the hanging length of the tackle is to be changed, or when the water depth of the tackle is to be changed, for instance.

A spinning reel in another aspect of the present invention is fitted on a fishing rod and winds fishing line around a first axis along the rod by the rotation of a handle, wherein this reel comprises a reel unit, a spool, an oscillating mechanism, a rotor, a rotor drive mechanism, and a sealing member. The reel unit is fitted on the fishing rod, and at the front thereof is formed a barrel open at the distal end. The spool is fitted on the reel unit movably in the first axis direction. The oscillating mechanism is a mechanism for longitudinally moving the spool by the rotation of the handle. The rotor is fitted on the reel unit rotatably around the first axis, and guides the fishing line onto the spool. The rotor drive mechanism is a mechanism for rotating the rotor by the rotation of the handle, having a pinion gear on which the rotor is non-rotatably fitted, which is supported on the reel unit rotatably around the first axis, and which is disposed so as to pass from inside the barrel into the inside of the reel unit. The sealing member seals the open end of the barrel.

With this spinning reel, the barrel is formed at the front part of the reel unit, and the pinion gear is rotatably supported inside this barrel and is disposed so as to pass through the inside of the reel unit. Because the open end of the barrel is sealed by the sealing member, the infiltration of liquid from the barrel is effectively prevented with a simple structure.

In another aspect the spinning reel of the invention is the device as set forth above, yet further wherein the barrel is disposed concentrically with the first axis. In this case, because the barrel is disposed concentrically with the rotational axis of the rotor, that is, with the pinion gear, the structure for waterproofing the open portion of the barrel is simpler.

In another aspect the spinning reel of the invention is the device as set forth above, yet further comprising a reversing check mechanism having a roller-type one-way clutch that is fitted inside the barrel and is able to assume a reversible state in which the rotation of the rotor in the reeling direction is permitted and a non-reversible state in which this rotation is prohibited, and a switching handling portion that operates the one-way clutch from the rear of the inner periphery of the barrel and switches this clutch between the above two states. In this case, it is difficult for liquid to seep into the barrel, so it is less likely that the one-way clutch disposed inside the barrel will be corroded. Also, since the one-way clutch can be switched from the rear of the inner periphery of the barrel by means of the switching handling portion, the members that make up the switching handling portion do not protrude on the distal end side of the barrel. Also, there is no need for a member that passes through the reel unit to the outside in the radial direction from the outer peripheral surface of the barrel. Accordingly, the inside of the barrel can be sealed with a very simply shaped sealing member, and the reel unit can be effectively waterproofed with a simple structure, even if a one-way clutch is provided inside the barrel.

In another aspect the spinning reel of the invention is the device as set forth above, yet further wherein the one-way clutch has an outer member non-rotatably fitted around the inner peripheral surface of the barrel, an inner member that is disposed on the inner peripheral side of the outer member and is non-rotatable with respect to the pinion gear, and a plurality of rolling members that are disposed between the above two members and are able to assume an operational position in which they engage between the outer and inner members and a non-operational position in which they idle between the outer and inner members, and the sealing member is disposed non-rotatably in the axial direction with respect to the barrel, and covers the outer member and the rolling members by coming into contact with the front part of the outer member. In this case, the movement of the entire one-way clutch in the axial direction can be restricted by providing a retainer structure to the sealing member, and there is no need for space in which to attach with a screw or the like, allowing the overall apparatus to be more compact.

In yet another aspect the spinning reel of the invention is the device as set forth above, yet further wherein at least part of the sealing member is made from an elastic material having a lip component with a tapered cross section that comes into contact with the outer peripheral surface of the inner ring on the inner peripheral side. In this case, because a tapered lip is provided to that portion of the sealing member that comes into contact with the inner member that rotates along with the pinion gear, there is less contact resistance with the inner member, and increases in the rotational resistance of the rotor can be kept to a minimum even if a waterproof structure is employed.

In a still other aspect the spinning reel of the invention is the device as set forth above, yet further wherein at least part of the sealing member is made from an elastic material having a lip component with a tapered cross section that comes into contact with the rotor on the inner peripheral side. In this case, because a tapered lip is provided to that portion of the sealing member that comes into contact with the rotor, there is less contact resistance with the rotor, and increases in the rotational resistance of the rotor can be kept to a minimum even if a sealed structure is employed.

In another aspect the spinning reel of the invention is the device as set forth above, yet further wherein the switching handling portion has a switching component that keeps the plurality of rolling members spaced apart in the peripheral direction and is disposed rotatably in the barrel and is able to move the rolling members as a group to the operational position and the non-operational position, a handling portion that is fitted on the reel unit pivotably around an axis parallel to the first axis, with one end protruding outside of the reel unit and the other end passing from inside the reel unit to the inner peripheral side of the barrel, and an actuator that is provided to the other end of the handling portion, engages the switching component on the inner peripheral side of the barrel, and rotates the switching component by the swinging of the handling portion. In this case, when one end of the handling portion is grasped and the handling portion is swung over, the actuator rotates the switching component and moves the rolling members between the operational position and non-operational position. Here, since the switching component is rotated via the actuator on the inner peripheral side of the barrel by the swinging of the handling portion, the state of the one-way clutch on inner peripheral side of the barrel can be effectively switched, and the reel unit, including the inside of the barrel, can be effectively waterproofed by a simple structure merely by sealing the opening at the distal end of the barrel with the sealing member.

In yet another aspect the spinning reel of the invention is the device as set forth above, yet further wherein one end of the handling portion is in the form of a lever protruding at the rear part of the reel unit. In this case, because the reversing check mechanism can be operated at the rear of the reel unit, it can be operated with the little finger of the hand holding the fishing rod, for example, without having to change hands.

In another aspect the spinning reel of the invention is the device as set forth above, yet further wherein one end of the handling portion is in the form of a lever protruding from the reel unit in a direction away from the fishing rod. In this case, because the reversing check mechanism can be operated at the lower part of the reel unit (the opposite side from the fishing rod), it can be operated with the little finger of the hand holding the fishing rod, for example, without having to change hands.

In still another aspect the spinning reel of the invention is the device as set forth above, yet further wherein the level winding mechanism has a threaded shaft disposed parallel to the first axis, having intersecting spiral grooves formed on its surface, and rotatably supported at its front end by the reel unit on the inner peripheral side of the barrel, a slider supported by the reel unit movably in the longitudinal direction, and engaging the spiral grooves, and a rotation transmission mechanism for transmitting the rotation of the pinion gear to the threaded shaft. In this case, because the front end of the threaded shaft is supported by the reel unit on the inner peripheral side of the barrel, and the open end of the barrel is sealed by the sealing member, liquid will not seep into the reel unit from the portion supporting the threaded shaft even if the support component of the threaded shaft is provided passing through the reel unit.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment

Overall Structure and Structure of the Reel Unit

Figure 1:
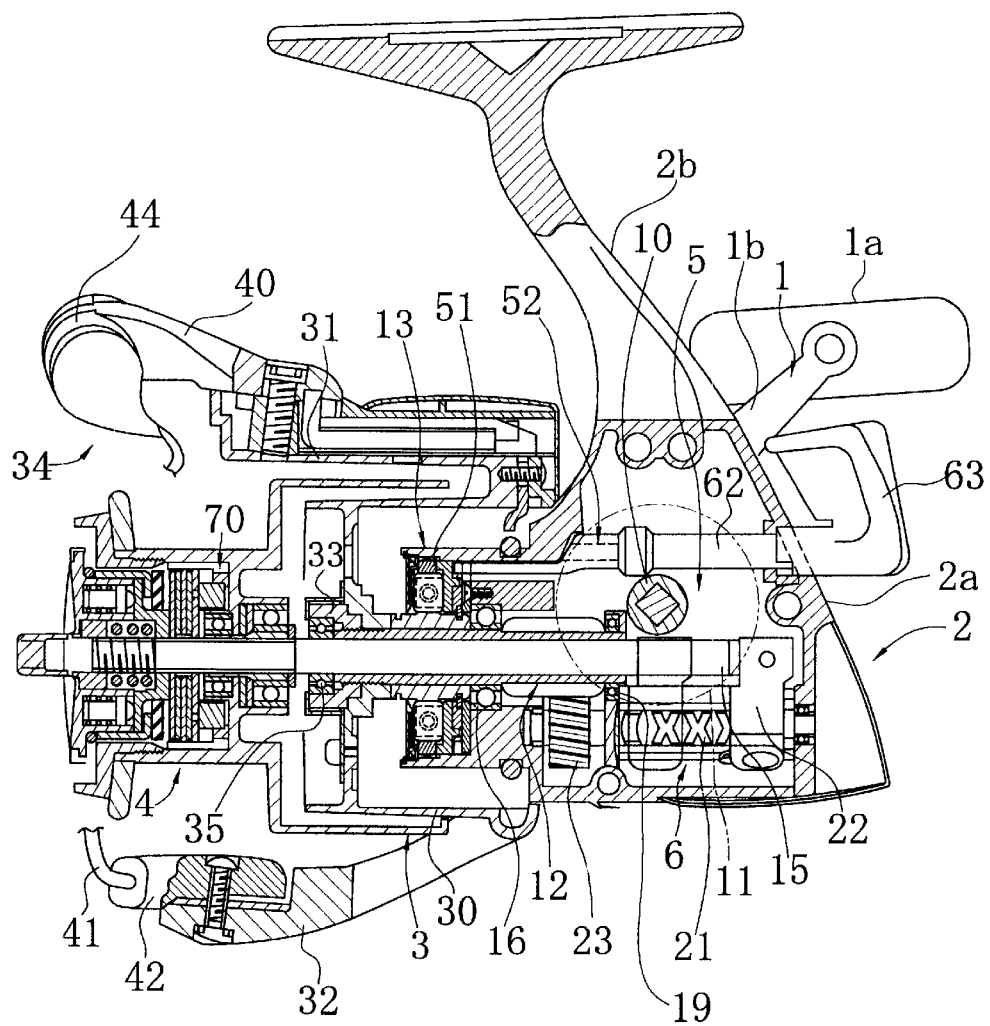
FIG. 1 is a cross section of the spinning reel in the 1st embodiment of the present invention.
Figure 2:
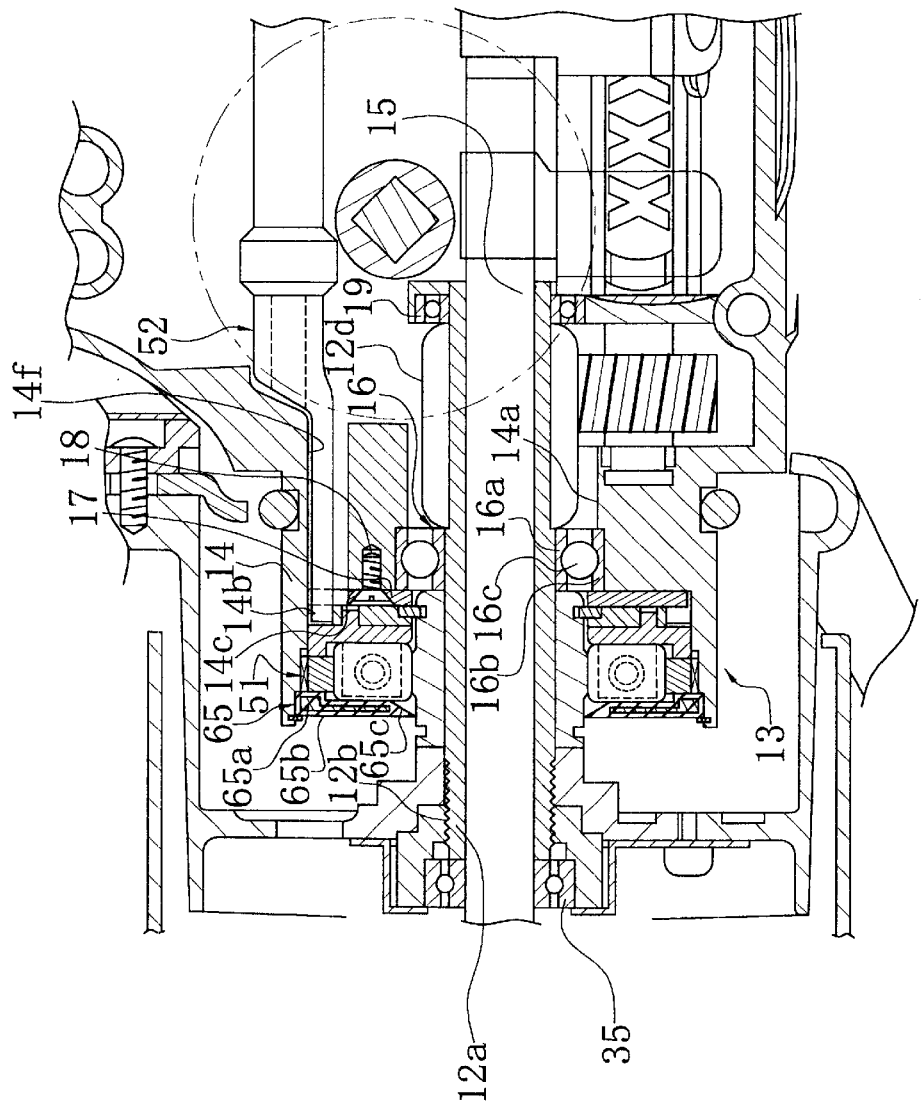
FIG. 2 is a cross section of main components thereof.

In FIGS. 1 and 2, a spinning reel in which an embodiment of the present invention is employed comprises a handle 1, a reel unit 2 that rotatably supports the handle 1, a rotor 3, and a spool 4. The rotor 3 guides the fishing line to the spool 4, and is rotatably supported at the front part of the reel unit 2. The spool 4 has fishing line wound around its outer peripheral surface, and is disposed at the front part of the rotor 3 such that it can move forward and backward.

The handle 1 has a T-shaped grip 1a and an L-shaped crank arm 1b, on the distal end of which is rotatably fitted the grip 1a. The crank arm 1b can be folded on the proximal end side. The handle 1 can be fitted on either the left or right side in FIG. 1 with respect to the reel unit 2.

The reel unit 2 has a reel body 2a having an opening on its side, and a T-shaped rod attachment leg 2b extending integrally upward and forward at an angle from the reel body 2a.

As shown in FIG. 1, the reel body 2a has a space on its inside for fitting mechanisms, and in this space are provided a rotor drive mechanism 5 that rotates the rotor 3 in conjunction with the rotation of the handle 1, and oscillating mechanism 6 that moves the spool 4 back and forth to uniformly wind the fishing line. A barrel 14 for housing a rotation check mechanism 13 (discussed below) is formed protruding forward at the front end of the reel body 2a. The barrel 14 is the cylindrical portion of a two-level structure having an inner small-diameter first cylindrical portion 14a and a second cylindrical portion 14b that is formed in a larger diameter than the first cylindrical portion 14a and ahead of the first cylindrical portion, and that is open at its distal end. An annular interlock groove 14d is formed on the open side of the second cylindrical portion 14b.

The rotor drive mechanism 5 has a handle shaft 10 which is disposed laterally and on which the handle 1 is fitted non-rotatably, a face gear 11 which rotates integrally with the handle shaft 10, a pinion gear 12 which meshes with the face gear 11, and a rotation check mechanism 13 which prevents the rotor 3 from rotating in the line winding-out direction. The two ends of the handle shaft 10 are rotatably supported by the reel body 2a via a bearing. The face gear 11 is a member provided either integrally or separately from the handle shaft 10 in the middle of the handle shaft 10.

The pinion gear 12 is a cylindrical member disposed in the longitudinal direction offset from the face gear 11. A toothed component 12d that meshes with the face gear 11 is formed at the rear of this pinion gear 12. The front 12a of the pinion gear 12 passes through the center of the rotor 3. A spool shaft 15 passes through the inside of the pinion gear 12. A male thread 12b is formed around the outer peripheral surface of the front 12a of the pinion gear 12, and the pinion gear 12 is fixed non-rotatably with the rotor 3 by a nut 33 that threads onto this male thread 12b. A bearing 35 is fitted on the inner peripheral part of the nut 33 between the nut 33 and the spool shaft 15. This bearing 35 maintains a predetermined gap between the spool shaft 15 and the inner peripheral surface of the pinion gear 12. Mutually parallel chamfers 12c for non-rotatably fitting the rotor 3 and the rotation check mechanism 13 are formed on the outer peripheral surface of the front 12a of the pinion gear 12.

The middle and rear parts of the pinion gear 12 in the axial direction thereof are rotatably supported on the reel body 2a via bearings 16 and 19, respectively. The bearing 16 is fitted on the first cylindrical portion 14a of the barrel 14 in a state of restricted rearward movement in the axial direction (to the right in FIG. 2). The bearing 16 is a ball bearing having an inner ring 16a fitted on the pinion gear 12, an outer ring 16b fitted on the first cylindrical portion 14a, and steel balls 16c that roll in contact with the rings 16a and 16b. The inner ring 16a of the bearing 16 is disposed in contact with the front end of the toothed component 12d of the pinion gear 12. The outer ring 16b is fitted to the first cylindrical portion 14a in a state of restricted rearward movement in the axial direction, and forward movement in the axial direction is restricted by a restriction member 17 (used as the restriction means).

The restriction member 17 is a washer-shaped disk member, and is fixed, for example, by four flat head screws 18 to a stepped component 14c between the first cylindrical portion 14a and the second cylindrical portion 14b. The rotation check mechanism 13 is fitted to the second cylindrical portion 14b in contact with the front surface of this restriction member 17. Even if thrust force should act upon the bearing 16 via the pinion gear 12, this restriction member 17 keeps the thrust force from being transmitted from the bearing 16 to the rotation check mechanism 13.

The oscillating mechanism 6 is used to move the spool 4 in the longitudinal direction. The oscillating mechanism 6 has a threaded shaft 21 disposed parallel to and directly beneath the spool shaft 15, a slider 22 that moves in the longitudinal direction along the threaded shaft 21, and a middle gear 23 fixed to the distal end of the threaded shaft 21. The rear end of the spool shaft 15 is non-rotatably fixed to the slider 22. The middle gear 23 meshes with the pinion gear 12.

The rotor 3 has a cylinder 30 fixed to the pinion gear 12, first and second rotor arms 31 and 32 provided facing each other to the side of the cylinder 30, and a bail arm 34 that serves as the fishing line guide mechanism for guiding the fishing line to the spool 4. The cylinder 30 and the first and second rotor arms 31 and 32 are made of an aluminum alloy, for example, and are integrally molded. The center portion at the distal end of the cylinder 30 is non-rotatably fixed to the distal end of the pinion gear 12 by the nut 33, as mentioned above.

The bail arm 34 is fitted pivotably between a line guide position and a line release position at the distal ends of the first and second rotor arms 31 and 32. The bail arm 34 has first and second bail support members 40 and 42 pivotably fitted at the distal ends of the first and second rotor arms 31 and 32, respectively, and a wire bail 41 that links the first and second bail support members 40 and 42. The first bail support member 40 is fitted pivotably to the outside of the first rotor arm 31, and the second bail support member 42 is fitted pivotably to the inside of the second rotor arm 32. A line roller 44 is rotatably fitted to the distal end of the first bail support member 40. The line roller 44 is provided so that the fishing line guided by the bail 41 will be guided smoothly to the spool 4.

Reversing Check Mechanism Configuration

Figure 3:
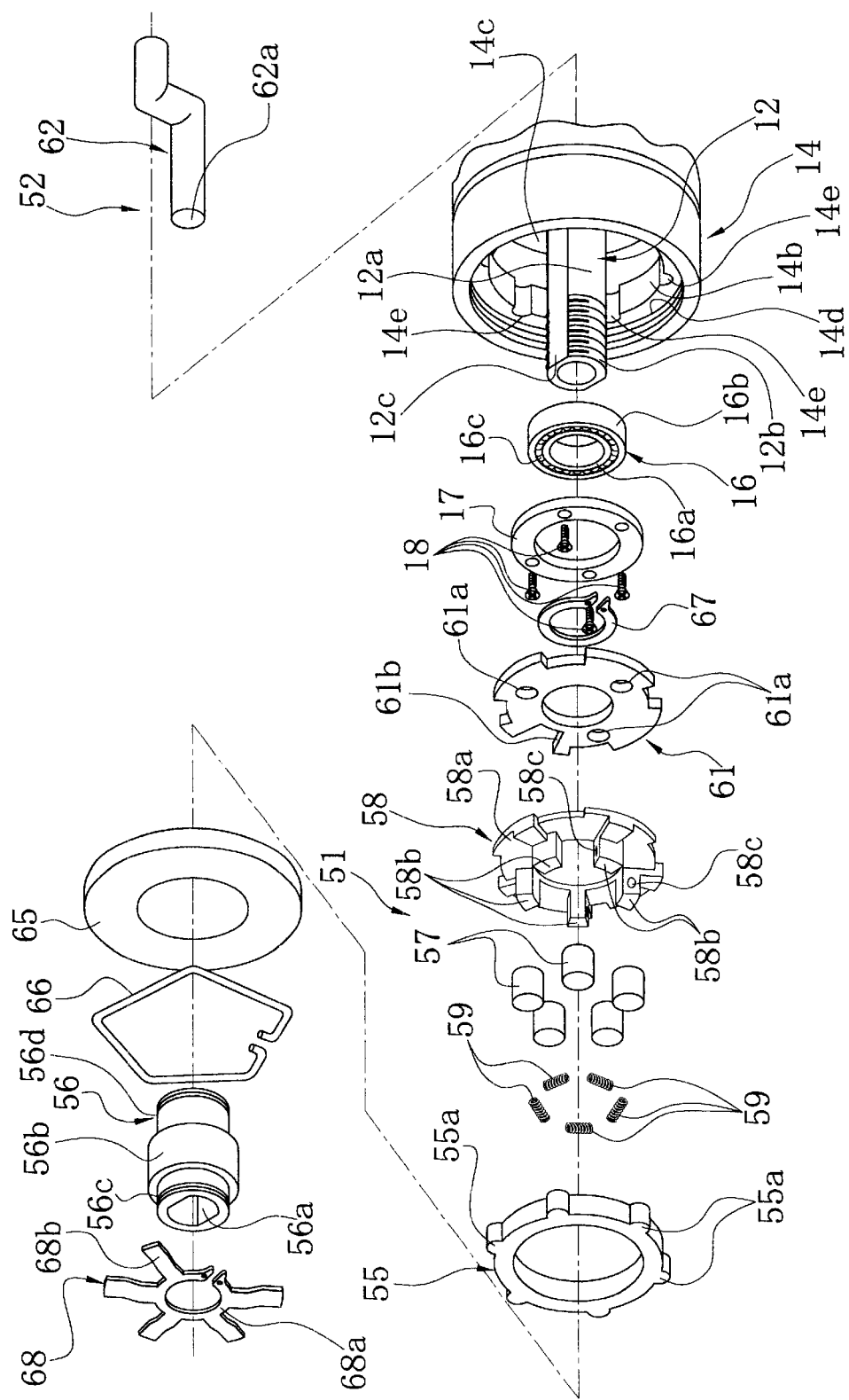
FIG. 3 is an exploded oblique view of the rotation check mechanism.

As shown in FIG. 2 and 3, the rotation check mechanism 13 has a roller-type one-way clutch 51 housed in the second cylindrical portion 14b, and an operating mechanism 52 that switches the one-way clutch 51 between an operating state and a non-operating state.

The one-way clutch 51 has an outer ring 55 fitted on the second cylindrical portion 14b so as to be incapable of relative rotation, an inner ring 56 fitted non-rotatably around the outside of the pinion gear 12, a plurality of rollers 57, and a cover member 65 that touches the front part of the outer ring 55 and covers the outer ring 55 and the rollers 57.

The outer ring 55 has a plurality of protrusions 55a around its outer periphery, and these protrusions 55a are engaged with depressions 14e provided on the second cylindrical portion 14b side. Here, a gap that is relatively wide in the radial direction is maintained between the distal ends of the protrusions 55a and the depressions 14e in the second cylindrical portion 14b, whereas the gap is narrower in the rotational direction. Consequently, the outer ring 55 is automatically centered by the inner ring 56 and the rollers 57. A cam face (not shown) having a recessed portion and an idle portion is formed around the inner peripheral surface of the outer ring 55. The length of the outer ring 55 in the axial direction is less than the length of the rollers 57 in the axial direction.

A support member 58 is housed inside the second cylindrical portion 14b to the rear of the outer ring 55. The support member 58 has a substantially disk-shaped main component 58a and a plurality of protrusions 58b protruding forward in the axial direction from the main component 58a. The plurality of protrusions 58b are formed at equal-angle spacing in the peripheral direction, and the plurality of rollers 57 are disposed between adjacent protrusions 58b. In this state, the plurality of rollers 57 are disposed between the outer ring 55 and the inner ring 56, and when they are moved in the circumferential direction by the support member 58, they are able to assume an operational position in which they engage between the rings and a non-operational position in which they idle between the rings. The plurality of rollers 57 can also be attached to the support member 58 from the front in the axial direction. In the clutch-on state in which the rollers 57 are in their operational position, the inner ring 56 is incapable of relative rotation with respect to the outer ring 55 in just the line winding-out direction, but in the clutch-off state in which the rollers 57 are in their non-operational position, the inner ring 56 is able to rotate relative to the outer ring 55 in both directions.

The plurality of rollers 57 are biased toward the operational position by coil springs 59. The coil springs 59 are housed in holes formed on one side of the protrusions 58b, and bias the rollers 57 toward the operational position (the engagement side).

The inner ring 56 is a cylindrical member, around the inner periphery of which is formed an oval hole 56a into which fit the chamfers 12c formed on the pinion gear 12. A large-diameter contact component 56b that is in contact with the rollers 57 is formed in the center around the outer periphery, on the ends of which are formed annular interlock grooves 56c and 56d.

The cover member 65 is a ring-shaped member provided in order to restrict the forward movement of the outer ring 55 and the rollers 57 in the axial direction, and to provide a watertight seal on the inside of the barrel 14. The cover member 65 is disposed in contact with the outer peripheral surface of the inner ring 56 and the inner peripheral surface of the second cylindrical portion 14b of the barrel 14 ahead of the outer ring 55 and the rollers 57. The cover member 65 has a metal reinforcing ring 65a in the form of a washer and made of a stainless steel alloy or the like, and a seal component 65b made of a synthetic resin elastic material such as NBR, SBR, or silicone rubber and molded so as to envelop the reinforcing ring 65a. A lip component 65c is formed around the inner periphery at the distal end of the seal component 65b. The lip component 65c hits the outer peripheral surface of the inner ring 56 and has a tapered cross sectional shape. The cover member 65 is restricted in its forward movement in the second cylindrical portion 14b by a retainer spring 66 fitted into the interlock groove 14d.

The retainer spring 66 is formed, for example, by bending an elastic metal wire into a pentagon. This retainer spring 66 restricts the forward movement of the cover member 65 in the axial direction, which in turn restricts the movement of the entire one-way clutch 51 in the axial direction.

Figure 4:
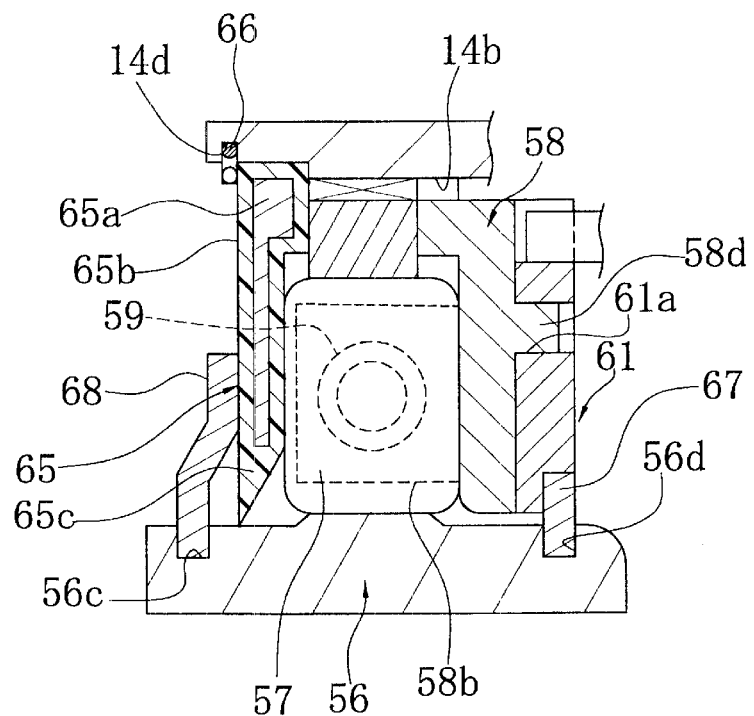
FIG. 4 is a detail cross section of the one-way clutch.

The operating mechanism 52 has a switching plate 61 disposed to the rear of the support member 58 inside the barrel 14, an operating rod 62 disposed further to the rear in the barrel 14, and an operating lever 63 linked to the rear end of the operating rod 62 (see FIG. 1). The switching plate 61 is a substantially disk-shaped member, and has three engagement holes 61a and an operating engagement component 61b. A tab 58d (FIG. 4) formed on the back of the support member 58 engages the three engagement holes 61a, and a protrusion 62a on the operating rod 62 engages the operating engagement component 61b. The rear end of the switching plate 61 is in contact with a stop ring 67 fitted into the interlock groove 56d at the rear of the outer peripheral surface of the inner ring 56. The rearward movement of the switching plate 61 in the axial direction is restricted by this stop ring 67. The operating rod 62 is supported rotatably within a specific angular range, such as about 90 degrees, by the reel body 2a, and is held at the rotational ends by toggle springs (not shown). Here, the distal end of the operating rod 62 passes through a fan-shaped through hole 14f formed in the rear surface of the barrel 14, engages the operating engagement component 61b, and is therefore not exposed to the outside from the outer peripheral surface of the barrel 14. Accordingly, the inside of the barrel 14 is structured so that a watertight seal is easy to maintain.

An assembly facilitating member 68 is detachably fitted to the interlock groove 56c at the front part of the inner ring 56. The assembly facilitating member 68 is fitted to the inner ring 56 when the one-way clutch 51 is being assembled, and is fitted so that the one-way clutch 51 and the switching plate 61 can be assembled all at once as a single unit. The assembly facilitating member has a main component 68a in the form of a C-shaped stop ring, and a plurality of pressing fingers 68b disposed radially around the outer periphery of the main component 68a. The main component 68a detachably interlocks with the interlock groove 56c. The pressing fingers 68b restrict the forward movement of the cover member 65.

The use of an assembly facilitating member 68 such as this allows the cover member 65 to be latched on the inner ring 56 side. Accordingly, rearward movement is restricted by the stop ring 67, all of the parts that make up the one-way clutch 51 can be sandwiched in between the cover member 65 and the switching plate 61 fitted to the inner ring 56, and the one-way clutch 51 and the switching plate 61 can be handled as a single unit for the purposes of assembly and disassembly. This assembly facilitating member 68 is removed once the retainer spring 66 is fitted. During disassembly, the retainer spring 66 is removed after the assembly facilitating member 68 has been fitted. This allows the one-way clutch 51 and the switching plate 61 to be removed together as a unit.

With the unitized portion of this rotation check mechanism 13, all of the constituent members can be attached in the axial direction, which aids automation of assembly in the unitization.

The spool 4 is disposed between the first rotor arm 31 and the second rotor arm 32 of the rotor 3, and is fitted to the distal end of the spool shaft 15 via a drag mechanism 70.

Operation of the Reel

To cast, the bail 41 is lowered to the line release a position. This causes the first and second bail support members 40 and 42 to rotate in the same direction.

During casting, for example, the rollers 57 are moved to the operational position by the operating lever 63 so that the rotor 3 will not reverse. Specifically, moving the operating lever 63 in one direction moves the operating rod 62 in the same direction. The force of this movement is directly transmitted to the switching plate 61 by the protrusion 62a on the operating rod 62, and is further transmitted to the rollers 57 via the support member 58. This puts the rollers 57 in a state in which they are able to move to the operational position. If the rotor 3 is rotated forward (the line reeling direction) in this state, the rollers 57 will idle between the outer ring 55 and the inner ring 56. Thus the forward rotation of the rotor 3 is not obstructed. If the rotor 3 is rotated in the other direction (the line winding-out direction), however, the rollers 57 will engage between the outer ring 55 and the inner ring 56, rendering them incapable of relative rotation. Here, since the outer ring 55 is fixed to the reel unit 2 by the barrel 14, the rotation of the inner ring 56, that is, rotation in the direction of the rotor (the direction in which the line is wound out), is prohibited.

When a cast is complete, the bail arm 34 is returned to the line reeling position by rotating the handle 1 in the line reeling direction and so forth. This guides the line via the bail 41 to the line roller 44, from where it curves and is guided to the spool 4.

If in this state the tackle snags on something or gets a bite from a fish, exerting tensile force on the line, because the reverse rotation of the rotor 3 is prohibited, the line roller 44 will be pulled forward and a forward thrust force will act upon the rotor 3 in the axial direction. When a forward thrust force acts upon the rotor 3, this thrust force is transmitted to the pinion gear 12, and is then transmitted through the pinion gear 12 to the bearing 16. The bearing 16, however, is restricted in its movement ahead of the outer ring 16b by the restriction member 17, so the thrust force is not transmitted from the bearing 16 to the one-way clutch 51.

Thus, with the present invention, forward thrust force does not act upon the one-way clutch 51, so the thrust force does not need to be taken into account in designing the size of the rollers 57, and problems such as an uneven load acting upon the rollers 57 are not encountered. Also, the overall movement of the one-way clutch 51 in the axial direction can be restricted by providing the load-lightening retainer spring 66 to the cover member 65, so there is no need for space in which to attach a screw or the like, allowing the overall apparatus to be more compact.

If the operating lever 63 is rotated in the opposite direction from that mentioned above, the rollers 57 are moved to the non-operational position by the same operation as above. In this state, the rollers 57 cannot engage between the outer ring 55 and the inner ring 56. Rotation of the inner ring 56 with respect to the outer ring 55 is therefore possible in both the forward and reverse directions, and the rotor 3 is able to rotate in the line winding-out direction.

When the line is reeled in, if the handle 1 is rotated with the bail arm 34 lowered to the line reeling position, this rotational force is transmitted to the pinion gear 12 through the handle shaft 10 and the face gear 11. This rotational force transmitted to the pinion gear 12 is transmitted through the front 12a thereof to the rotor 3, and the rotor 3 rotates in the line reeling direction.

Meanwhile, the threaded shaft 21 is rotated by the gear 23 that meshes with the pinion gear 12, and the slider 22 that meshes with the groove 21a in the threaded shaft 21 moves in the longitudinal direction. Accordingly, the spool shaft 15 and the spool 4 move back and forth in the longitudinal direction, and the fishing line guided by the bail 41 and the line roller 44 to the spool 4 is wound uniformly in the longitudinal direction around the outside of the spool 4.

Second Embodiment

Overall Configuration and Reel Unit Structure

Figure 6:
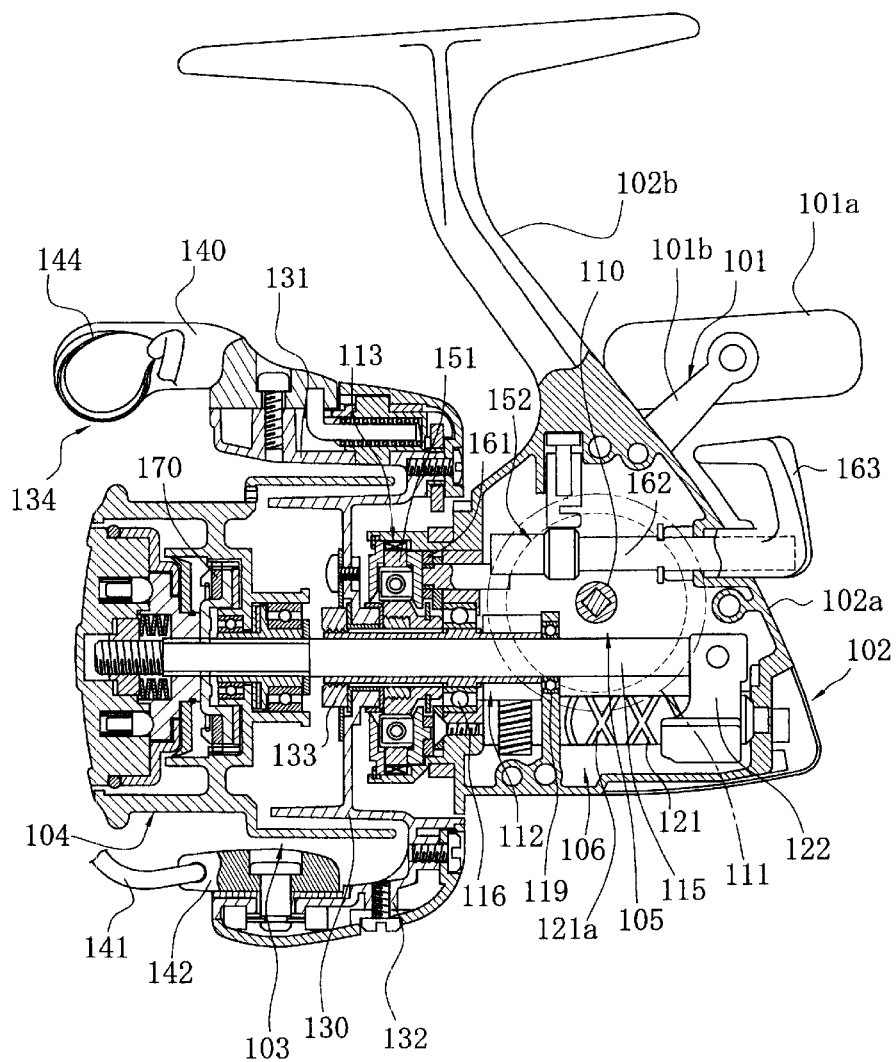
FIG. 6 is a cross section of the spinning reel in the 2nd embodiment of the present invention.
Figure 7:
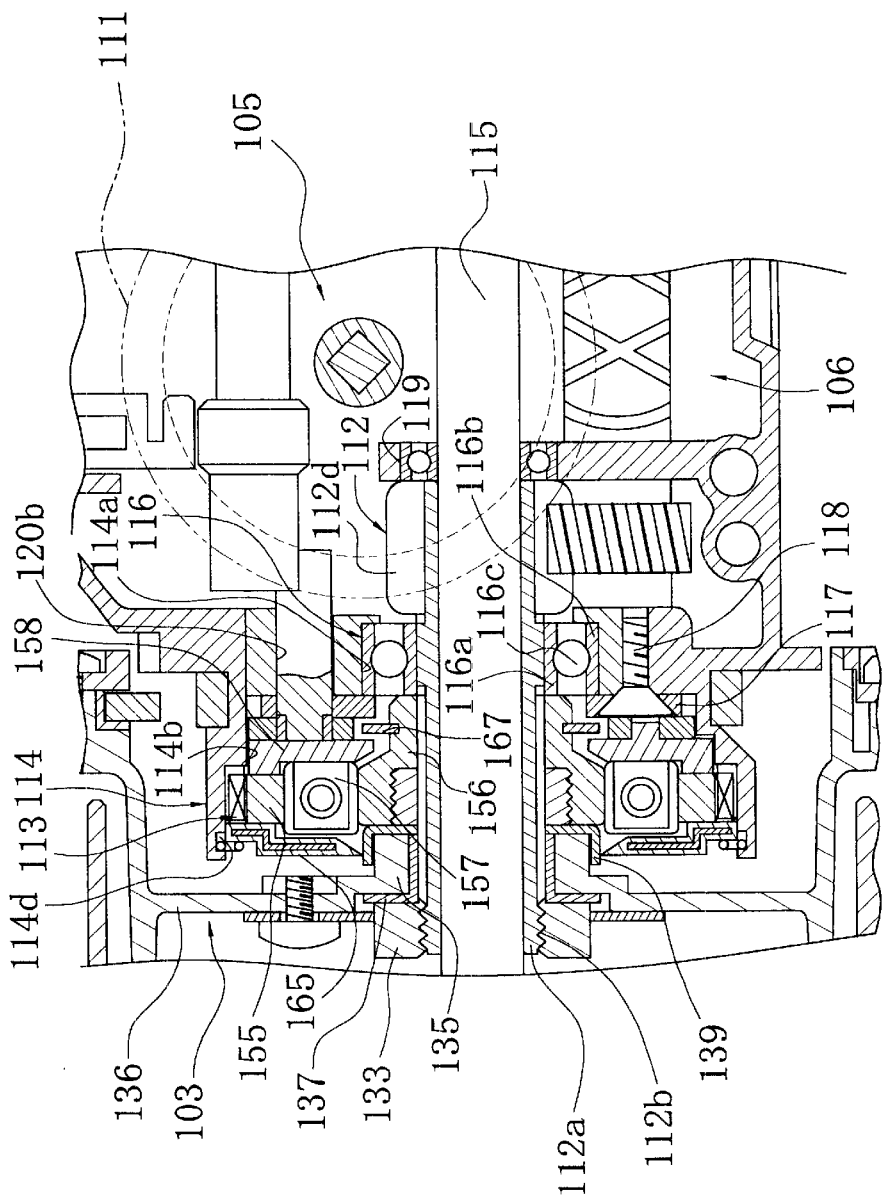
FIG. 7 is a cross section of main components thereof.

In FIGS. 6 and 7, a spinning reel in which the second embodiment of the present invention is employed comprises a handle 101, a reel unit 102 that rotatably supports the handle 101, a rotor 103, and a spool 104. The rotor 103 guides the fishing line to the spool 104, and is rotatably supported at the front part of the reel unit 102. The spool 104 has fishing line wound around its outer peripheral surface, and is disposed at the front part of the rotor 103 such that it can move forward and backward.

The handle 101 has a T-shaped grip 101a and an L-shaped crank arm 101b, on the distal end of which is rotatably fitted the grip 101a. The crank arm 101b can be folded on the proximal end side. The handle 101 can be fitted on either the left or right side in FIG. 6 with respect to the reel unit 102.

The reel unit 102 has a reel body 102a having an opening on its side, and a T-shaped rod attachment leg 102b extending integrally upward and forward at an angle from the reel body 102a. The reel unit 102 is made of a metal such as an aluminum alloy or magnesium alloy.

The reel body 102a has a space on its inside for fitting mechanisms. In this space are provided a rotor drive mechanism 105 that rotates the rotor 103 in conjunction with the rotation of the handle 101, and an oscillating mechanism 106 that moves the spool 104 back and forth to uniformly wind the fishing line.

As shown in FIG. 7, a barrel 114 having an opening at its distal end is formed protruding forward. A reversing check mechanism 113 that prohibits the reverse rotation of the rotor 103 is housed in the barrel 114. The barrel 114 is the cylindrical portion of a two-level structure having an inner small-diameter first cylindrical portion 114a and a second cylindrical portion 114b that is formed in a larger diameter than the first cylindrical portion 114a and ahead of the first cylindrical portion 114a, and that is open at its distal end. An annular interlock groove 114d is formed on the open side of the second cylindrical portion 114b.

Figure 10:
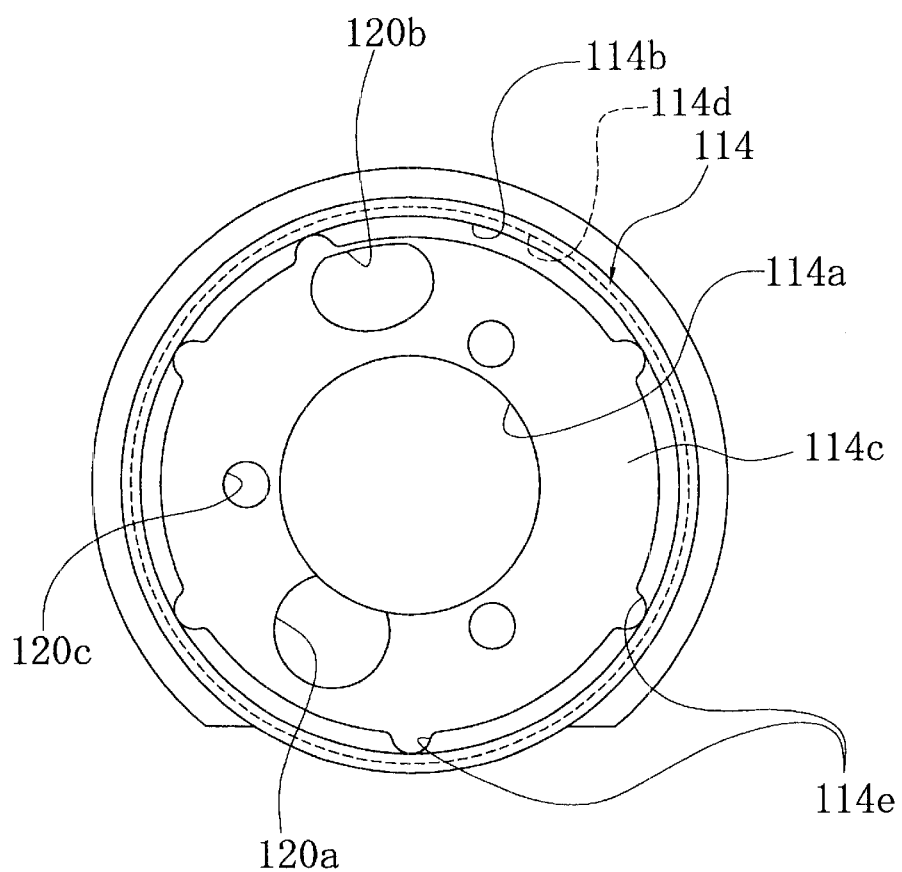
FIG. 10 is a partial front view of the reel body.

The first cylindrical portion 114a constitutes a bore for supporting the pinion gear 112 (discussed below), and passes through the interior of the reel body 102a. As shown in FIG. 10, a first through hole 120a for supporting the front end of the threaded shaft 121 (discussed below) of the oscillating mechanism 106, and a second through hole 120b through which passes the distal end of an operating rod 162 (discussed below) of the reversing check mechanism 113 are formed at a stepped component 114c between the first cylindrical portion 114a and the second cylindrical portion 114b. Three screw holes 120c for fixing the restriction member 117 (discussed below) are also formed.

As shown in FIG. 6, the rotor drive mechanism 105 has a handle shaft q10 which is disposed laterally and on which the handle 101 is fitted non-rotatably, a face gear 111 which rotates integrally with the handle shaft 110, a pinion gear 112 which meshes with the face gear 111, and a reversing check mechanism 113 which prevents the rotor 103 from rotating in the line winding-out direction. The two ends of the handle shaft 110 are rotatably supported by the body 102a via a bearing. The face gear 111 is a member provided either integrally or separately from the handle shaft 110 in the middle of the handle shaft 110.

The pinion gear 112 is disposed in a cylindrical member disposed in the longitudinal direction offset from the face gear 111, and is made of a copper zinc alloy (brass), for example. A toothed component 112d that meshes with the face gear 111 is formed at the rear of this pinion gear 112. The front 112a of the pinion gear 112 passes through the center of the rotor 103. A spool shaft 115 passes through the inner periphery of the pinion gear 112. A male thread 112b is formed around the outer peripheral surface of the front 112a of the pinion gear 112, and the pinion gear 112 is fixed non-rotatably with the rotor 103 by a nut 133 made of a stainless steel alloy, for example, that threads onto this male thread 112b. Mutually parallel chamfers 112c (FIG. 8) for non-rotatably fitting the rotor 103 and the reversing check mechanism 113 are formed on the outer peripheral surface of the front 112a of the pinion gear 112.

The pinion gear 112 is disposed passing through the barrel 114 and extending into the interior of the reel body 102a, and the middle and rear end parts in the axial direction thereof are rotatably supported by the reel unit 102 via bearings 116 and 119, respectively. The bearing 116 is fitted on the first cylindrical portion 114a of the barrel 114 in a state of restricted rearward movement in the axial direction (to the right in FIG. 7). The bearing 116 is a ball bearing having an inner ring 116a fitted on the pinion gear 112, an outer ring 116b fitted on the first cylindrical portion 114a, and steel balls 116c that roll in contact with the rings 116a and 116b. The inner ring 116a of the bearing 116 is disposed in contact with the front end of the toothed component 112d of the pinion gear 112. The outer ring 116b is fitted to the first cylindrical portion 114a in a state of restricted rearward movement in the axial direction, and forward movement in the axial direction is restricted by a restriction member 117. The bearing 119 is disposed inside the reel body 102a.

The restriction member 117 is a washer-shaped disk member, and is fixed, for example, by three flat head screws 18 that are threaded into the screw holes 120c at the stepped component 114c between the first cylindrical portion 114a and the second cylindrical portion 114b. The reversing check mechanism 113 is fitted to the second cylindrical portion 114b in contact with the front surface of this restriction member 117. Even if thrust force should act upon the bearing 116 via the pinion gear 112, this restriction member 117 keeps the thrust force from being transmitted from the bearing 116 to the reversing check mechanism 113.

The oscillating mechanism 106 is used to move the spooll 4 in the longitudinal direction. As shown in FIG. 6, the oscillating mechanism 106 has a threaded shaft 121 disposed parallel to the spool shaft 115, a slider 122 that moves in the longitudinal direction along the threaded shaft 121, and a middle gear 123 fixed to the distal end of the threaded shaft 121. Intersecting spiral grooves 121a are formed on the surface of the threaded shaft 121, and engaging members (not shown) that engage the spiral grooves 121a are fitted on the slider 122. The front end of the threaded shaft 121 is rotatably supported by a bearing (not shown) inside the first through hole 120a. The rear end of the spool shaft 115 is non-rotatably fixed to the slider 122. The middle gear 123 meshes with the pinion gear 112 via a rotation transmission mechanism (not shown).

The rotor 103 has a cylinder 130 fixed to the pinion gear 112, first and second rotor arms 131 and 132 provided facing each other to the side of the cylinder 130, and a bail arm 134 that serves as the fishing line guide mechanism for guiding the fishing line to the spool 104. The cylinder 130 and the first and second rotor arms 131 and 132 are made of a magnesium alloy, for example, and are integrally molded. A wall 136 having a boss 135 is formed in the center of the inner peripheral portion of the cylinder 130, and is non-rotatably fixed by the nut 133 to the front 112a of the pinion gear 112 through which the boss 135 passes.

Because the rotor 103 is made of a magnesium alloy, the pinion gear 112 is made of brass, and the nut 133 is made of a stainless steel alloy, the tendency toward ionization of the rotor 103 is very different from that of the pinion gear 112 and the nut 133. Accordingly, the magnesium alloy rotor 103 will be prone to corrosion if it is in direct contact with the brass pinion gear 112 or the nut 133. In this embodiment, therefore, a flange member 137 made of a dielectric material such as a synthetic resin is interposed between the boss 135 and the pinion gear 112 and between the boss 135 and the nut 133. A barrel 137a of this flange member 137 is disposed between the boss 135 and the front 112a of the pinion gear 112, and a flange 137b is disposed between the boss 135 and the nut 133.

The bail arm 134 is fitted pivotably between a line guide position and a line release position at the distal ends of the first and second rotor arms 131 and 132. The bail arm 134 has first and second bail support members 140 and 142 pivotably fitted at the distal ends of the first and second rotor arms 131 and 132, respectively, and a wire bail 141 that links the first and second bail support members 140 and 142. The first bail support member 140 is fitted pivotably to the outside of the first rotor arm 131, and the second bail support member 142 is fitted to the inside of the second rotor arm 132. A line roller 144 is rotatably fitted to the distal end of the first bail support member 140. The line roller 144 is provided so that the fishing line guided by the bail 141 will be guided smoothly to the spool 14.

The spool 14 is disposed between the first rotor arm 131 and second rotor arm 132 of the rotor 103, and is fitted to the distal end of the spool shaft 115 via a drag mechanism 170.

Reversing Check Mechanism Configuration

Figure 8:
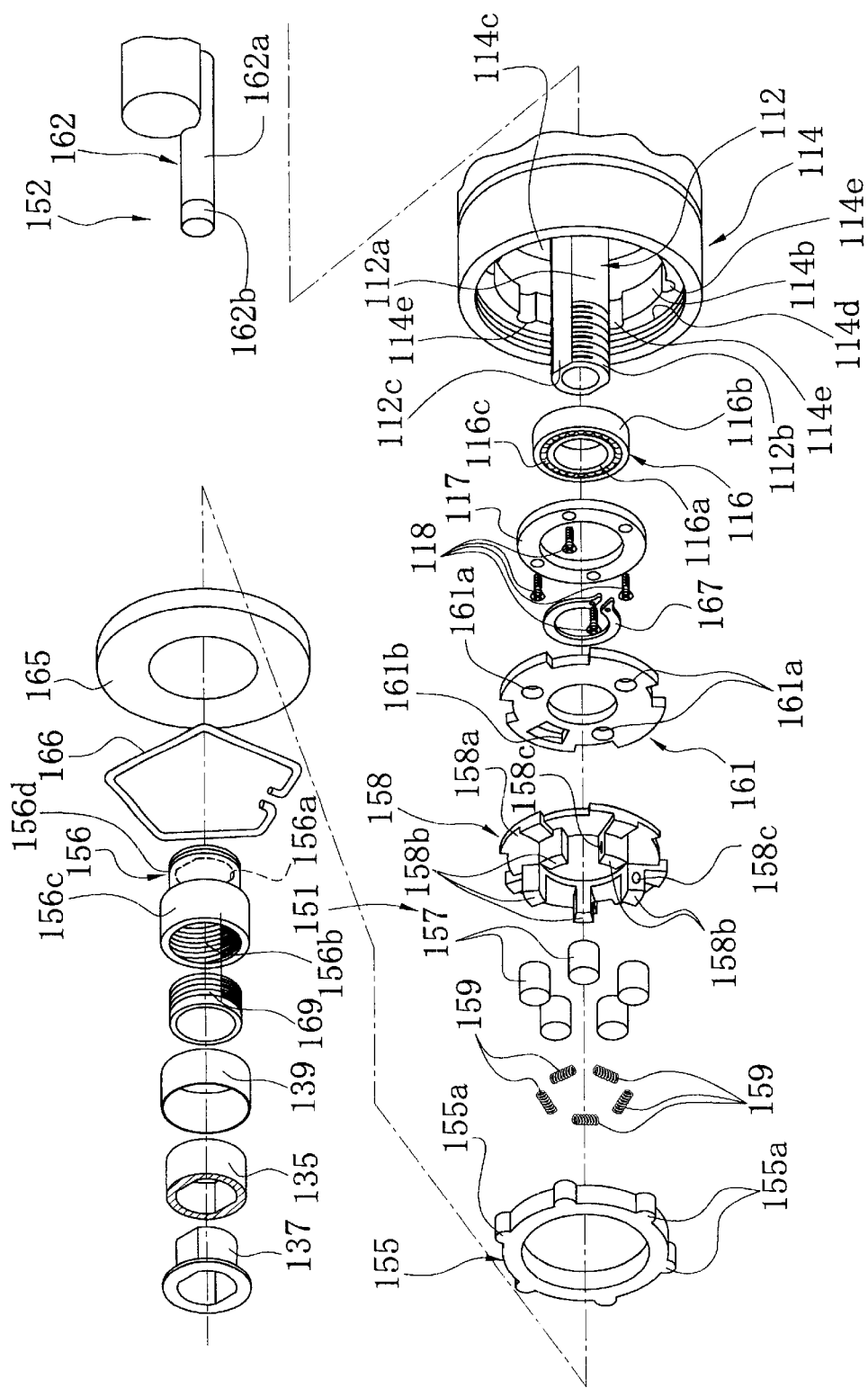
FIG. 8 is an exploded oblique view of the reversing check mechanism.
Figure 9:
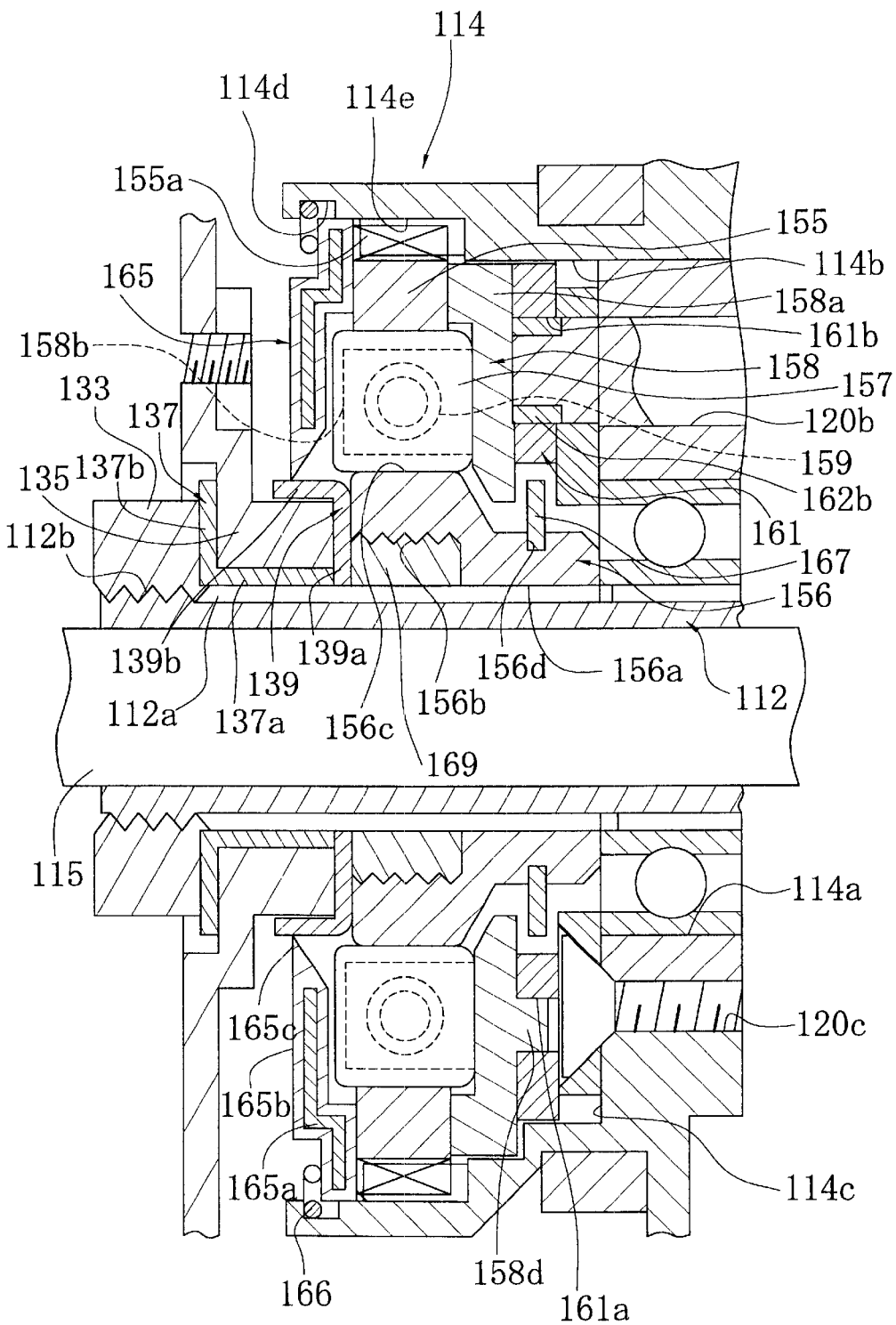
FIG. 9 is a detail cross section of the one-way clutch.

As shown in FIGS. 7 to 9, the reversing check mechanism 113 has a roller-type one-way clutch 151 housed in the second cylindrical portion 114b and capable of assuming a reversal-prohibited state in which the reverse rotation of the rotor 103 is prohibited and a reversal-permitted state in which reverse rotation is permitted, and a switch operating mechanism 152 that switches the one-way clutch 151 between the reversal-prohibited state and the reversal-permitted state.

The one-way clutch 151 has an outer ring 155 fitted on the second cylindrical portion 114b so as to be incapable of relative rotation, an inner ring 156 fitted non-rotatably around the outside of the pinion gear 112, and a plurality of rollers 157 made of a stainless steel alloy. A sealing member 165 that touches the outer ring 155 and covers the outer ring 155 and the rollers 157 is provided to front part of the outer ring 155.

The outer ring 155 is, for example, a thick-walled ring-shaped member made of a stainless steel alloy, and has a plurality of protrusions 155a around its outer periphery. These protrusions 155a are engaged with depressions 114e provided on the second cylindrical portion 114b side. Here, a gap that is relatively wide in the radial direction is maintained between the distal ends of the protrusions 155a and the depressions 114e in the second cylindrical portion 114b, whereas the gap is narrower in the rotational direction. Consequently, the outer ring 155 is automatically centered by the inner ring 156 and the rollers 157. A cam face (not shown) having a recessed portion and an idle portion is formed around the inner peripheral surface of the outer ring 155. The length of the outer ring 155 in the axial direction is less than the length of the rollers 157 in the axial direction.

A rotatable support member 158 is housed inside the second cylindrical portion 114b to the rear of the outer ring 155. The support member 158 keeps the plurality of rollers 157 spaced apart in the peripheral direction, and has a substantially disk-shaped main component 158a and a plurality of protrusions 158b protruding forward in the axial direction from the main component 158a. The plurality of protrusions 158b are formed at equal-angle spacing in the peripheral direction, and the plurality of rollers 157 are disposed between adjacent protrusions 158b.

In this state, the plurality of rollers 157 are disposed between the outer ring 155 and the inner ring 156, and when they are moved in the circumferential direction by the support member 158, they are able to assume an operational position in which they engage between the rings and a non-operational position in which they idle between the rings. The plurality of rollers 157 can also be attached from the front of the support member 158 in the axial direction. In the clutch-on state in which the rollers 157 are in their operational position, the inner ring 156 is incapable of relative rotation with respect to the outer ring 155 in just the line winding-out direction, but in the clutch-off state in which the rollers 157 are in their non-operational position, the inner ring 156 is able to rotate relative to the outer ring 155 in both directions.

The plurality of rollers 157 are biased toward the operational position by coil springs 159. The coil springs 159 are housed in 158c formed on one side of the protrusions 158b, and bias the rollers 157 toward the operational position (the engagement side).

The inner ring 156 is a cylindrical member made of a stainless steel alloy, for example, and having a step. Around the inner periphery on the small-diameter side is formed an oval hole 156a into which fit the chamfers 112c formed on the pinion gear 112. A female threaded component 156b is formed around the inner peripheral surface on the large-diameter side. A large-diameter contact component 156c that is in contact with the rollers 157 is formed around the outer peripheral surface on the large-diameter side, and an annular interlock groove 156d is formed around the outer peripheral surface on the small-diameter side. A stop ring 167 is fitted into the interlock groove 156d. The stop ring 167 is disposed on the rear end side of the support member 158, and the rearward movement of the support member 158 in the axial direction is restricted by this stop ring 167. The rear end of the boss 135 of the rotor 103 hits the large-diameter distal end of the inner ring 156.

Here again, in order to prevent the electrolytic corrosion of the magnesium alloy rotor 103, a holed cap member 139 made of a synthetic resin is fitted to the rear end of the boss 135 in contact with the inner ring 156. A disk component 139a of this cap member 139 is disposed between the rear end surface of the boss 135 and the distal end of the inner ring 156, and the distal end of the sealing member 165 is in contact with the outer peripheral surface of a circular component 139b.

This cap member 139 prevents electrolytic corrosion and also functions as a sealing member that prevents liquids from seeping in from the inner peripheral side of the one-way clutch 151. Specifically, when the cap member 139 is disposed between the boss 135 and the inner ring 156, the cap member 139 is compressed by the boss 135 as the boss 135 is squeezed by the nut 133, forming a seal between the rear end surface of the boss 135 and the distal end surface of the inner ring 156.

This cap member 139 also has the function of stabilizing the sealing performance of the sealing member 165. Specifically, if the distal end is in direct contact with the outer peripheral surface of the boss 135, then when the rotor 103 is fixed to the pinion gear 112, the sealing of the sealing member 165 will be poor unless the rotor 103 is properly centered. In view of this, fitting the cap member 139 and thereby centering the sealing member 165 ahead of time allows the sealing performance of the sealing member 165 to be stabilized.

A cylindrical assembly bolt 169 is threaded into the female threaded component 156b of the inner ring 156. The assembly bolt 169 is used so that when the one-way clutch 151 is assembled, the one-way clutch 151 can be fitted to the inner ring 156 and made into a unit which can be attached in a single step.

The sealing member 165 has a simple shape, such as that of a ring, and is provided in order to restrict the forward movement of the outer ring 155 and the rollers 157 in the axial direction, and to provide a watertight seal to the interior of the barrel 114. The sealing member 165 is disposed in contact with the outer peripheral surface of the cap member 139 and the inner peripheral surface of the second cylindrical portion 114b of the barrel 114. The sealing member 165 has a metal reinforcing ring 165a in the form of a washer and made of a stainless steel alloy or the like, and a seal component 165b made of a synthetic resin elastic material such as NBR, SBR, or silicone rubber and molded so as to envelop the reinforcing ring 165a. A lip component 165c is formed at the distal end on the inner peripheral side of the seal component 165b. The lip component 165c hits the outer peripheral surface of the inner ring 156 and has a tapered cross sectional shape. The sealing member 165 is restricted in its forward movement in the second cylindrical portion 114b by a retainer spring 66 fitted into the interlock groove 114d. The retainer spring 166 is formed, for example, by bending an elastic metal wire into a pentagon. This retainer spring 166 restricts the forward movement of the sealing member 165 in the axial direction, which in turn restricts the movement of the entire one-way clutch 151 in the axial direction.

As shown in FIGS. 6 and 8, the switch operating mechanism 152 has a switching plate 161 disposed to the rear of the support member 158 inside the barrel 114, an operating rod 162 disposed further to the rear in the barrel 114, and an operating lever 163 linked to the rear end of the operating rod 162. As shown in FIG. 8, the switching plate 161 is a substantially disk-shaped member, and has three engagement holes 161a and an operating engagement component 161b. A tab 158d (FIG. 9) formed on the back of the support member 158 engages the three engagement holes 161a, and a protrusion 162a on the operating rod 162 engages the operating engagement component 161b.

The operating rod 162 is supported rotatably within a specific angular range, such as about 90 degrees, by the reel body 102a, and is held at the rotational ends by toggle springs (not shown). Here, the distal end component 162a of the operating rod 162 is eccentric from the rotational center and extends forward. A ring-shaped actuator 162b is fitted to the distal end of this distal end component 162a, this distal end component 162a passes through the fan-shaped second through hole 120b formed in the stepped component 114c of the barrel 114, and the actuator 162b engages the operating engagement component 161b. This distal end component 162a passes through the second through hole 120b formed passing through on the inner peripheral side from the outer peripheral surface of the barrel 114, and is not exposed to the exterior outward radially from the barrel 114. Thus, the two through holes 120a and 120b and the portions of the first cylindrical portion 114a and the like that pass through the interior of the reel body 102a are all disposed on the inner peripheral side of the barrel 114, which has a circular structure that is easy to seal watertight, so the reel unit 102 can be effectively sealed with a simple structure by means of the sealing member 165 with its simple ring-shaped structure.

Also, with the unitized portion of this reversing check mechanism 113, all of the constituent members can be attached in the axial direction, which aids automation of assembly in the unitization.

Operation of the Reel

To cast, the bail 141 is lowered to the line release position. This causes the first and second bail support members 140 and 142 to rotate in the same direction.

During casting, for example, the rollers 157 are moved to the operational position by the operating lever 163 so that the rotor 103 will not reverse. Specifically, moving the operating lever 163 in one direction moves the operating rod 162 in the same direction. The force of this movement is directly transmitted to the switching plate 161 by the protrusion 62a on the operating rod 162, and is further transmitted to the rollers 157 via the support member 158. This puts the rollers 157 in a state in which they are able to move to the operational position. Thus the forward rotation of the rotor 103 is not obstructed. If the rotor 103 is rotated forward (the line reeling direction) in this state, the rollers 157 will idle between the outer ring 155 and the inner ring 156. If the rotor 103 is rotated in the other direction (the line winding-out direction), however, the rollers 157 will engage between the outer ring 155 and the inner ring 156, rendering them incapable of relative rotation. Here, since the outer ring 155 is fixed to the reel unit 102 by the barrel 114, the rotation of the inner ring 156, that is, rotation in the direction of the rotor (the direction in which the line is wound out), is prohibited.

When a cast is complete, the bail arm 134 is returned to the line reeling position by rotating the handle 101 in the line reeling direction and so forth. This guides the line via the bail 141 to the line roller 144, from where it curves and is guided to the spool 104.

If in this state the tackle snags on something or gets a bite from a fish, exerting tensile force on the line, because the reverse rotation of the rotor 103 is prohibited, the line roller 144 will be pulled forward and a forward thrust force will act upon the rotor 103 in the axial direction. When a forward thrust force acts upon the rotor 103, this thrust force is transmitted to the pinion gear 112, and is then transmitted through the pinion gear 112 to the bearing 116. The bearing 116, however, is restricted in its movement ahead of the outer ring 116b by the restriction member 117, so the thrust force is not transmitted from the bearing 116 to the one-way clutch 151.

If the operating lever 163 is rotated in the opposite direction from that mentioned above, the rollers 157 are moved to the non-operational position by the same operation as above. In this state, the rollers 157 cannot engage between the outer ring 155 and the inner ring 156. Rotation of the inner ring 156 with respect to the outer ring 155 is therefore possible in both the forward and reverse directions, and the rotor 103 is able to rotate in the line winding-out direction.

When the line is reeled in, if the handle 101 is rotated with the bail arm 134 lowered to the line reeling position, this rotational force is transmitted to the pinion gear 112 through the handle shaft 110 and the face gear 111. This rotational force transmitted to the pinion gear 112 is transmitted through the front 112a thereof to the rotor 103, and the rotor 103 rotates in the line reeling direction.

Meanwhile, the threaded shaft 121 is rotated by the middle gear 123 that meshes with the pinion gear 112, and the slider 122 that meshes with the threaded shaft 121 moves in the longitudinal direction. Accordingly, the spool shaft 115 and the spool 104 move back and forth in the longitudinal direction, and the fishing line guided by the bail 141 and the line roller 144 to the spool 104 is wound uniformly in the longitudinal direction around the outside of the spool 104.

Even if a liquid such as sea water should seep in through the gap between the rotor 103 and the spool 104 while the above operation is being performed, or when the reel is being washed, it will be difficult for the liquid to get into the barrel 114 because the sealing member 165 is disposed at the distal end of the barrel 114. This means that the reversing check mechanism 113 housed inside the barrel 114 is more resistant to corrosion. Also, since it is also difficult for a liquid to seep into the reel body 102a from the barrel 114, the rotor drive mechanism 105 and the oscillating mechanism 106 are also more resistant to corrosion.

Figure 5:
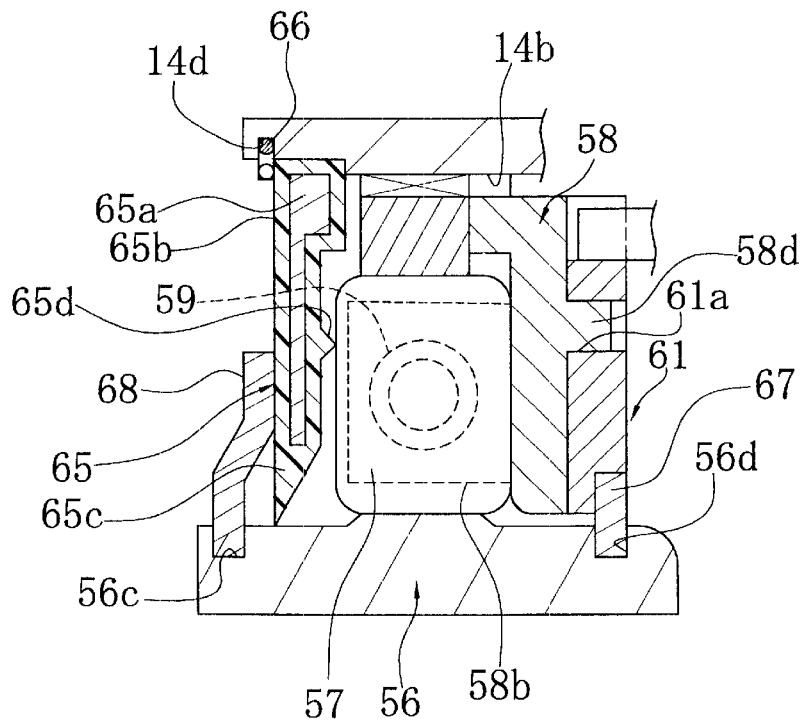
FIG. 5 is a diagram corresponding to FIG. 4 of another embodiment.

Other Embodiments (a) As shown in FIG. 5, the annular protrusions 65d in contact with the rollers 57 may also be formed on the rear surface of the cover member. In this case, movement of the rollers 57 in the axial direction can be restricted, affording an increase in the transmission efficiency of the one-way clutch 51 and allowing the noise made by movement in the axial direction to be suppressed.

(b) In the above embodiment, the cover member 65 is doubled as a seal, but a sealing member may instead be provided separately from the cover member 65.

(c) In the above embodiment, the rotation check mechanism 13 could be switched between and held in an operational position and a non-operational position, but an ordinary, unswitchable roller-type one-way clutch may be used instead. In this case, the rotor 3 cannot be rotated in the line winding-out direction.

(d) In the above embodiment, the restriction member 17 (the restriction means) comprised a washer-shaped member, and was fixed to the barrel 14 by the flat head screws 18, but may instead be fixed to the barrel 14 by a detachable stop ring, such as a C-shaped stop ring, or the restriction means itself may be a stop ring. Furthermore, the heads of the screws may be used to restrict the movement of the outer ring 16b of the bearing 16.

(e) When the pinion gear 12 is designed to be fitted from the inside of the reel body 2a, a ring-shaped restricting protrusion formed protruding to the inside of the barrel 14 may be provided as the restriction means, and the forward movement of the bearing 16 may be restricted by this restricting protrusion.

Figure 11:
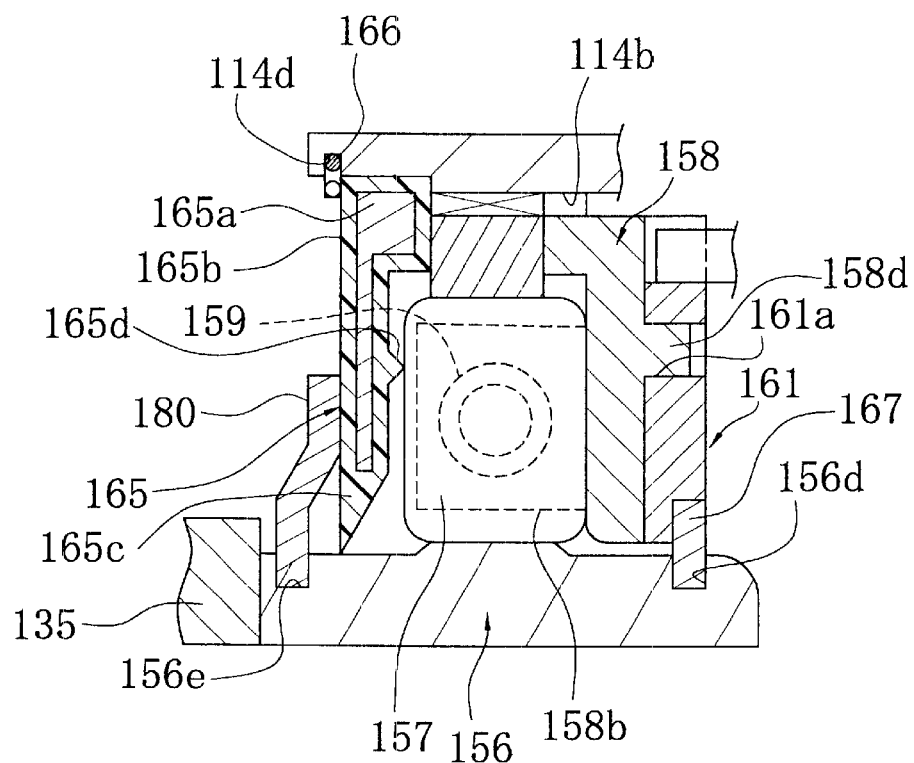
FIG. 11 is a diagram corresponding to FIG. 4 of another embodiment.

(f) As shown in FIG. 11, the length of the inner ring 156 may be extended ahead of the sealing member 165. In this case, the lip component 165c of the sealing member 165 is in contact with the inner peripheral surface of the inner ring 156. Furthermore, an annular groove 156e may be formed at the front end of the outer peripheral surface of the inner ring 156, and an assembly facilitating member 180 may be fitted during assembly. This fitting of the assembly facilitating member 180 makes it easier for the one-way clutch 151 to be installed as an integral unit inside the barrel 114 during assembly. This assembly facilitating member 180 is removed upon completion of assembly.

(g) As also shown in FIG. 11, the annular protrusions 165d in contact with the rollers 157 may also be formed on the rear end surface of the sealing member 165. In this case, movement of the rollers 157 in the axial direction can be restricted, affording an increase in the transmission efficiency of the one-way clutch 151 and allowing the noise made by movement in the axial direction to be suppressed.

(h) In the above embodiment, the operating lever 163 was disposed to the rear of the reel body 102a, but it may instead be disposed on the lower side of the reel unit (the side away from the fishing rod).

(i) In the above embodiment, the bearing 116 and the reversing check mechanism 113 were housed in the barrel 114, but just the bearing 16 may be housed therein, and a pawl-type reversing check mechanism may be disposed outside of the barrel 114.

Accordingly, with the present invention in one aspect, even when a thrust force acts upon a bearing from the rotor via the pinion gear, because the forward movement of the bearing is restricted by the restriction means, this force will be received by the restriction means and will not be transmitted forward from the bearing. Accordingly, even if forward thrust force should act upon the rotor, it will not act upon the one-way clutch of the rotation check mechanism provided ahead of the bearing.

With the invention in another aspect, because the opening in the barrel is sealed with the sealing member, liquid can be effectively prevented from seeping in from the barrel by means of a simple structure.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A rotor drive device for use within a spinning reel unit, said rotor drive device for line-reel-in driving a rotor in response to rotation of a handle rotatively supported on the reel unit, and for preventing reversing of the rotor in the line winding-out direction, the spinning reel rotor drive device comprising:

a face gear for rotating in conjunction with rotation of the handle;

a pinion gear disposed along a longitudinal direction offset from said face gear and non-rotatable with respect to the rotor, for meshing with said face gear;

a bearing fitted on the front of the reel unit for rotatively supporting said pinion gear in the reel unit;

restriction means fixedly coupled to the reel unit for restricting forward movement of said bearing; and a reversing check mechanism having a roller-type one-way clutch provided frontward of said restriction means, for checking rotor reversal in the line wind-out direction, with said restriction means being provided axially between said bearing and said reversing check mechanism, wherein the reel unit frontward has a barrel formed with a first cylindrical section and a front-end open second cylindrical section, the second cylindrical section being formed forward of the first cylindrical section, said bearing is fitted into the first cylindrical section, said one-way clutch is fitted into the second cylindrical section, and said restriction means is a plate member disposed between the first cylindrical section and second cylindrical section.

2. A spinning reel rotor drive device as set forth in claim 1, wherein said bearing is a rolling-contact bearing having:
an outer race fitted in the reel unit;
an inner race disposed to an inner circumferential side of said outer race and fitted to said pinion gear; and
a plurality of rolling elements disposed circumferentially spaced apart between said two races and in contact with said two races, and
said restriction means restricts forward movement of said outer race.

3. A spinning reel rotor drive device as set forth in claim 1, wherein said one-way clutch has:
an outside member non-rotatable with respect to the reel unit;
an inside member disposed to an inner circumferential side of said outside member and non-rotatable with respect to said pinion gear;
a plurality of roller members disposed between said outer and inside members, said outer and inside members being configured such that said roller members are able to assume a biting-in operational position in between the outer and inside members and an idle-rolling non-operational position between the outer and inside members; and
a cover member disposed so as to contact an axial front side of said outside member and be axially immovable with respect to the reel unit, for covering said outside member and said roller members from the axial front side.

4. The spinning reel as set forth in claim 3, wherein
said outside member is fitted non-rotatably into said second cylindrical section;
said inside member is rotatable relative to said outside member and has axial extent by which either end protrudes from said outside member; and
said cover member is axially immovably fitted into said second cylindrical section toward the open end thereof from said outside member, and seals a gap between said inside member along its outer circumferential surface and said second cylindrical section along its inner circumferential surface.

5. The spinning reel as set forth in claim 4, wherein
an annular groove is formed in the inner circumferential surface of said second cylindrical section toward the open end; the spinning reel rotor drive device therein further comprising an elastic stop member fitted in the annular groove for stopping said cover member by restricting its axially forward movement.

6. The spinning reel as set forth in claim 4, wherein
at least part of said cover member is made from an elastic material inner peripherally having a lip tapered in cross section and contacting the outer circumferential surface of said inside member.

7. The spinning reel as set forth in claim 6, wherein
said cover member includes a washer-shaped reinforcement ring made of metal, and a seal portion inner peripherally having said lip and made of an elastic substance and formed enveloping said reinforcement ring.

8. The spinning reel as set forth in claim 4, wherein
along said cover member diametrically are annular protrusions protruding toward said roller members for contacting said roller members.

9. The spinning reel as set forth in claim 3, wherein
the rotor has a boss portion fitted non-rotatably front-endwise to said pinion gear;
said outside member is fitted non-rotatably into said second cylindrical section;
said inside member is rotatable relative to said outside member; and
said cover member is axially immovably fitted into said second cylindrical section toward the open end thereof from said outside member, and seals a gap between said inside member along its outer circumferential surface and said second cylindrical section along its inner circumferential surface.

10. A spinning reel rotor drive device for use within a spinning reel unit, said rotor drive device for line-reel-in driving a rotor in response to rotation of a handle rotatively supported on the reel unit, and for preventing reversing of the rotor in the line winding-out direction, the spinning reel rotor drive device comprising:
a face gear for rotating in conjunction with rotation of the handle;
a pinion gear disposed along a longitudinal direction offset from said face gear and non-rotatable with respect to the rotor, for meshing with said face gear;
a bearing fitted on the front of the reel unit for rotatively supporting said pinion gear in the reel unit;
restriction means fixedly coupled to the reel unit for restricting forward movement of said bearing; and
a reversing check mechanism having a roller-type one-way clutch provided frontward of said restriction means, for checking rotor reversal in the line wind-out direction, with said restriction means being provided axially between said bearing and said reversing check mechanism, wherein
said one-way clutch has:
an outside member non-rotatable with respect to the reel unit;
an inside member disposed to an inner circumferential side of said outside member and non-rotatable with respect to said pinion gear;
a plurality of roller members disposed between said outer and inside members, said outer and inside members being configured such that said roller members are able to assume a biting-in operational position in between the outer and inside members and an idle-rolling non-operational position between the outer and inside members; and
a cover member disposed so as to contact an axial front side of said outside member and be axially immovable with respect to the reel unit, for covering said outside member and said roller members from the axial front side,
the reel unit frontward has a barrel formed with a first cylindrical section and a front-end open second cylindrical section, said second cylindrical section being formed forward of said first cylindrical section and having a larger diameter than said first cylindrical section,
said bearing is fitted into said first cylindrical section,
said one-way clutch is fitted into said second cylindrical section, and said restriction means is a plate member fixed to a stepped portion formed boundary-wise between said first cylindrical section and second cylindrical section.

11. A spinning reel rotor drive device as set forth in claim 10, wherein said outside member is fitted non-rotatably into said second cylindrical section;

said inside member is rotatable relative to said outside member and has axial extent by which either end protrudes from said outside member; and said cover member is axially immovably fitted into said second cylindrical section toward the open end thereof from said outside member, and seals a gap between said inside member along its outer circumferential surface and said second cylindrical section along its inner circumferential surface.

12. A spinning reel rotor drive device as set forth in claim 11, wherein along said cover member diametrically are annular protrusions protruding toward said roller members for contacting said roller members.

13. A spinning reel rotor drive device as set forth in claim 10, the rotor having a boss portion fitted non-rotatably front-endwise to said pinion gear; wherein said outside member is fitted non-rotatably into said second cylindrical section;

said inside member is rotatable relative to said outside member; and said cover member is axially immovably fitted into said second cylindrical section toward the open end thereof from said outside member, and seals a gap between said inside member along its outer circumferential surface and said second cylindrical section along its inner circumferential surface.

14. A spinning reel rotor drive device for use within a spinning reel unit, said spinning reel rotor drive being for line-reel-in driving the rotor in response to rotation of a handle rotatively supported on the reel unit, and for preventing reversing of the rotor in the line winding-out direction, the spinning reel rotor drive device comprising:

a face gear for rotating in conjunction with rotation of the handle;

a pinion gear disposed along a longitudinal direction offset from said face gear and non-rotatable with respect to the rotor, for meshing with said face gear;

a bearing fitted on the front of the reel unit for rotatively supporting said pinion gear in the reel unit;

restriction means provided on the reel unit for restricting forward movement of said bearing; and a reversing check mechanism having a roller-type one-way clutch provided frontward of said restriction means, for checking rotor reversal in the line wind-out direction, wherein said one-way clutch has:

an outer member non-rotatable with respect to the reel unit;

an inside member disposed to the inner circumferential side of said outside member and non-rotatable with respect to said pinion gear;

a plurality of roller members disposed between said outer and inside members, said outer and inside members being configured such that said roller members are able to assume a biting-in operational position in between the outer and inside members and an idle-rolling non-operational position between the outer and inside members; and a cover member disposed in frontward contact with said outside member and axial immovable with respect to the reel unit, for covering said outside member and said roller members, the reel unit frontward has a barrel formed with a first cylindrical section and a front-end open second cylindrical section formed forward of said first cylindrical section to be larger diameter than said first cylindrical section, said bearing is fitted into said first cylindrical section, said one-way clutch is fitted into said second cylindrical section, said restriction means is a plate member fixed to a stepped portion formed boundary-wise between said first cylindrical section and second cylindrical section, said outside member is fitted non-rotatably into said second cylindrical section, said inside member is rotatable relative to said outside member and has axial extent by which either end protrudes from said outside member, said cover member is axially immovably fitted into said second cylindrical section toward the open end thereof from said outside member, and seals a gap between said inside member along its outer circumferential surface and said second cylindrical section along its inner circumferential surface, and an annular groove is formed in the inner circumferential surface of said second cylindrical section toward the open end; the spinning reel rotor drive device therein further comprising an elastic stop member fitted in the annular groove for stopping said cover member by restricting its axially forward movement.

15. A spinning reel rotor drive device for use within a spinning reel unit, said spinning reel rotor being for line-reel-in driving the rotor in response to rotation of a handle rotatively supported on the reel unit, and for preventing reversing of the rotor in the line winding-out direction, the spinning reel rotor drive device comprising:

a face gear for rotating in conjunction with rotation of the handle;

a pinion gear disposed along a longitudinal direction offset from said face gear and non-rotatable with respect to the rotor, for meshing with said face gear;

a bearing fitted on the front of the reel unit for rotatively supporting said pinion gear in the reel unit;

restriction means provided on the reel unit for restricting forward movement of said bearing; and a reversing check mechanism having a roller-type one-way clutch provided frontward of said restriction means, for checking rotor reversal in the line wind-out direction, wherein said one-way clutch has:

an outer member non-rotatable with respect to the reel unit;

an inside member disposed to the inner circumferential side of said outside member and non-rotatable with respect to said pinion gear;

a plurality of roller members disposed between said outer and inside members, said outer and inside members being configured such that said roller members are able to assume a biting-in operational position in between the outer and inside members and an idle-rolling non-operational position between the outer and inside members; and a cover member disposed in frontward contact with said outside member and axial immovable with respect to the reel unit, for covering said outside member and said roller members, the reel unit frontward has a barrel formed with a first cylindrical section, and a front-end open second cylindrical section formed forward of said first cylindrical section to be larger diameter than said first cylindrical section, said bearing is fitted into said first cylindrical section, said one-way clutch is fitted into said second cylindrical section, said restriction means is a plate member fixed to a stepped portion formed boundary-wise between said first cylindrical section and second cylindrical section, said outside member is fitted non-rotatably into said second cylindrical section, said inside member is rotatable relative to said outside member and has axial extent by which either end protrudes from said outside member, said cover member is axially immovably fitted into said second cylindrical section toward the open end thereof from said outside member, and seals a gap between said inside member along its outer circumferential surface and said second cylindrical section along its inner circumferential surface, and at least part of said cover member is made from an elastic material inner peripherally having a lip tapered in cross section and contacting the outer circumferential surface of said inside member.

16. A spinning reel rotor drive device as set forth in claim 15, wherein said cover member includes a washer-shaped reinforcement ring made of metal, and a seal portion inner peripherally having said lip and made of an elastic substance and formed enveloping said reinforcement ring.

17. A spinning reel rotor drive device for use within a spinning reel unit, said rotor drive device for line-reel-in driving a rotor in response to rotation of a handle rotatively supported on the reel unit, and for preventing reversing of the rotor in the line winding-out direction, the spinning reel rotor drive device comprising:

a face gear for rotating in conjunction with rotation of the handle;

a pinion gear disposed along a longitudinal direction offset from said face gear and non-rotatable with respect to the rotor, for meshing with said face gear;

a bearing fitted on the front of the reel unit for rotatively supporting said pinion gear in the reel unit;

restriction means fixedly coupled to the reel unit for restricting forward movement of said bearing; and a reversing check mechanism having a roller-type one-way clutch provided frontward of said restriction means, for checking rotor reversal in the line wind-out direction, with said restriction means being provided axially between said bearing and said reversing check mechanism, wherein said one-way clutch has:

an outside member non-rotatable with respect to the reel unit;

an inside member disposed to an inner circumferential side of said outside member and non-rotatable with respect to said pinion gear;

a plurality of roller members disposed between said outer and inside members, said outer and inside members being configured such that said roller members are able to assume a biting-in operational position in between the outer and inside members and an idle-rolling non-operational position between the outer and inside members; and a cover member disposed so as to contact an axial front side of said outside member and be axially immovable with respect to the reel unit, for covering said outside member and said roller members from the axial front side, said inside member having a component-fitting portion to which is detachably fitted an assembly-assisting member for fixing said cover member on its inside-member side.

18. A spinning reel rotor drive device for use within a spinning reel unit, said rotor drive device for line-reel-in driving a rotor in response to rotation of a handle rotatively supported on the reel unit, and for preventing reversing of the rotor in the line winding-out direction, the spinning reel rotor drive device comprising:

a face gear for rotating in conjunction with rotation of the handle;

a pinion gear disposed along a longitudinal direction offset from said face gear and non-rotatable with respect to the rotor, for meshing with said face gear;

a bearing fitted on the front of the reel unit for rotatively supporting said pinion gear in the reel unit;

restriction means fixedly coupled to the reel unit for restricting forward movement of said bearing; and a reversing check mechanism having a roller-type one-way clutch provided frontward of said restriction means, for checking rotor reversal in the line wind-out direction, with said restriction means being provided axially between said bearing and said reversing check mechanism, wherein:

said one-way clutch has:

an outside member non-rotatable with respect to the reel unit;

an inside member disposed to an inner circumferential side of said outside member and non-rotatable with respect to said pinion gear;

a plurality of roller members disposed between said outer and inside members, said outer and inside members being configured such that said roller members are able to assume a biting-in operational position in between the outer and inside members and an idle-rolling non-operational position between the outer and inside members; and a cover member disposed so as to contact an axial front side of said outside member and be axially immovable with respect to the reel unit, for covering said outside member and said roller members from the axial front side, said one-way clutch further has a retaining member for retaining said plurality of roller members spaced apart in the rotational direction between said outside member and said inside member, and an urging member for urging said roller members toward the operational position; and said reversing check mechanism further has an operating mechanism disposed clasping said outside member on its opposite side from the cover member for moving said plurality of roller members between the operational position and the non-operational position by moving said retaining member in the rotational direction.

19. A fishing-rod attachable spinning reel for winding fishing line about a first axis substantially paralleling the rod by rotation of a reel handle, the spinning reel comprising:

a reel unit having a distal-end open barrel formed frontward thereof;

a reeling spool fitted on said reel unit movably in the first axial direction;

an oscillating mechanism for shifting said spool back and forth by rotation of the handle;

a rotor fitted on said reel unit to be rotatable about the first axis, for guiding fishing line onto said spool;

a rotor drive mechanism for rotating said rotor by rotation of the handle, said rotor drive mechanism having a pinion gear to which said rotor is non-rotatably fitted, the pinion gear being supported in said barrel to be rotatable about the first axis and being disposed passing from inside the barrel into inside said reel unit; and a sealing member for sealing the open end of the barrel to provide a water-proof seal on an inside of said barrel.

20. A spinning reel as set forth in claim 19, wherein the barrel is disposed concentrically with the first axis.

21. A spinning reel as set forth in claim 19, further comprising a reversing check mechanism having:

a roller-type one-way clutch fitted inside said barrel and able to assume a reversing-allowed state allowing rotation of the rotor in the reeling-in direction, and a reversing-prohibited state prohibiting rotor reeling-in rotation; and a switching handle for operating said one-way clutch from of the rearward inner periphery of the barrel, and for switching said one-way clutch between the reversing-allowed and reversing-prohibited states.

22. A spinning reel as set forth in claim 21, wherein said one-way clutch has:

an outside member non-rotatably fitted to an inner circumferential surface of said barrel;

an inside member disposed on an inner circumferential side of said outside member and being non-rotatable with respect to said pinion gear; and a plurality of roller members disposed between said outside and inside members, said outer and inside members being configured such that said roller members are able to assume a biting-in operational position in between the outer and inside members and an idle-rolling non-operational position between the outer and inside members, and said sealing member is disposed in frontward contact with said outside member so as to be axially immovable with respect to said barrel, for covering said outside member and said roller members.

23. A spinning reel as set forth in claim 22, wherein at least part of said sealing member is made from an elastic material inner peripherally having a lip tapered in cross section and abutting on the outer circumferential surface of the inside member.

24. A spinning reel as set forth in claim 22, wherein at least part of said sealing member is made from an elastic material inner peripherally having a lip tapered in cross section and abutting on the rotor.

25. A spinning reel as set forth in claim 22, wherein the switching handle has:

a switching portion retaining said plurality of rolling members circumferentially spaced apart, disposed rotatively in said barrel for shifting said rolling members collectively between the operational position and the non-operational position;

a handling portion fitted to the reel unit to be pivotable about an axis parallel to the first axis, with one end protruding outside said reel unit and the other end passing from inside said reel unit toward the inner periphery of said barrel; and an actuator provided on the other end of the handling portion, for engaging said switching portion on the inner peripheral side of said barrel, and pivoting said handling portion to turn said switching portion.

26. A spinning reel as set forth in claim 25, wherein one end of the handling portion is in the form of a lever projecting from the rear of said reel unit.

27. A spinning reel as set forth in claim 25, wherein when the spinning reel is attached to a fishing rod, one end of the handling portion is in the form of a lever protruding from the reel unit in a direction away from the fishing rod.

28. A spinning reel as set forth in claim 19, wherein the oscillating mechanism has:

a threaded shaft disposed parallel to the first axis, having intersecting spiral grooves formed superficially thereon, and rotatively supported at its front end by said reel unit on the inner peripheral side of said barrel;

a slider engaging the spiral grooves and supported by said reel unit to be longitudinally shiftable; and a rotation transmission mechanism for transmitting rotation of said pinion gear to said threaded shaft.

29. The spinning reel as set forth in claim 19, wherein at least part of said sealing member is made from an elastic material inner peripherally having a lip tapered in cross section.

30. The spinning reel as set forth in claim 29, wherein said lip abuts on said rotor.

31. A spinning reel comprising:

a reel body formed with a frontward open-ended barrel housing;

a pinion gear rotatively fitted in the reel body and extending in a shaft protruding axially from the barrel housing, for carrying a rotor non-rotatably attached thereto;

restriction means fixedly fitted into the barrel housing for restricting axially forward shift of the pinion gear;

a rotor-reversing check mechanism fitted concentrically onto said pinion gear, axially forward of the restriction means, wherein forward thrust acting on said pinion gear during spinning reel operation is prevented from acting on said rotor-reversing check mechanism due to said restriction means; and a seal fitted into the forward end of the barrel housing substantially flush with the open end, for water-proof sealing said barrel housing and said rotor-reversing check mechanism therein.

32. A spinning reel as set forth in claim 31, further comprising a bearing for supporting the pinion gear shaft, disposed in the reel body forward-end adjacent the pinion gear and rearward-end adjacent the restriction means; wherein said restriction means restricts axially forward shift of the pinion gear via the bearing.

33. A spinning reel as set forth in claim 32, further comprising restriction means provided between said one-way clutch and said bearing.

34. A fishing-rod attachable spinning reel for winding fishing line by rotation of a reel handle, said spinning reel comprising:

a reel unit having a barrel formed frontward of said reel unit, said barrel having a bottom that can seal a space inside said barrel;

a reeling spool fitted on said reel unit;

an oscillating mechanism for shifting said spool back and forth by rotation of the handle;

a rotor rotatably fitted on said reel unit; and a rotor drive mechanism for rotating said rotor by rotation of the handle, said rotor drive mechanism having
- a face gear for rotating in conjunction with rotation of the handle,
- a pinion gear to which said rotor is non-rotatably fitted, said pinion gear being provided extending in a direction different from a direction in which said face gear extends, said pinion gear meshing with said face gear,
- a bearing provided within said space inside said barrel for rotatably coupling said pinion gear to said reel unit, and
- a reverse prevention mechanism for preventing reversal of said rotor in the line wind-out direction, said reverse prevention mechanism including a roller-type one-way clutch and a switching mechanism, said one-way clutch being non-rotatably coupled to an inner peripheral surface of said barrel and configured to take one of reverse-prevented mode and reverse-permitted mode, said switching mechanism being disposed passing from outside said space of said barrel into said space through said bottom, said switching mechanism being configured to switch said one-way clutch between said reverse-prevented mode and said reverse-permitted mode.

* * * * *